(12) United States Patent
Kubo et al.

(10) Patent No.: US 7,064,801 B2
(45) Date of Patent: Jun. 20, 2006

(54) LIQUID CRYSTAL DISPLAY DEVICE

(75) Inventors: Masumi Kubo, Ikoma (JP); Akihiro Yamamoto, Yamatokoriyama (JP); Hiroyuki Ohgami, Shiki-gun (JP); Takashi Ochi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 10/934,412

(22) Filed: Sep. 7, 2004

(65) Prior Publication Data

US 2005/0052601 A1 Mar. 10, 2005

(30) Foreign Application Priority Data

Sep. 5, 2003 (JP) ............... 2003-314200

(51) Int. Cl.
*G02F 1/1337* (2006.01)
(52) U.S. Cl. ..................... 349/129; 349/130
(58) Field of Classification Search ............... 349/129, 349/130
See application file for complete search history.

(56) References Cited

U.S. PATENT DOCUMENTS

| 6,567,144 | B1 * | 5/2003 | Kim et al. ............ 349/128 |
| 6,573,964 | B1 * | 6/2003 | Takizawa et al. ............ 349/129 |
| 6,583,837 | B1 * | 6/2003 | Fukumoto et al. ............ 349/129 |
| 6,614,497 | B1 * | 9/2003 | Yamada ............ 349/129 |
| 6,661,488 | B1 | 12/2003 | Takeda et al. |
| 6,710,825 | B1 | 3/2004 | Kubo et al. |
| 6,721,024 | B1 | 4/2004 | Kishimoto et al. |
| 2001/0040546 | A1 | 11/2001 | Ohmuro et al. |
| 2002/0159018 | A1 | 10/2002 | Kataoka et al. |

OTHER PUBLICATIONS

U.S. Appl. No. 10/898,688, filed Jul. 26, 2004.

* cited by examiner

*Primary Examiner*—Andrew Schechter
*Assistant Examiner*—David Y. Chung
(74) *Attorney, Agent, or Firm*—Nixon & Vanderhye P.C.

(57) ABSTRACT

An alignment-divided vertical alignment liquid crystal display device permitting improvement in response characteristic while suppressing reduction in contrast ratio is provided. The device has a plurality of pixels each having a first electrode, a second electrode facing the first electrode, and a vertical alignment liquid crystal layer placed between the first and second electrodes. Ribs are placed in a surface portion of the liquid crystal layer close to the first electrode and/or a surface portion thereof close to the second electrode. The ribs have slope side faces put in contact with the liquid crystal layer, and satisfy the relationships $RL/PS \geq 0.05$ ($\mu m^{-1}$) and $RS/PS \leq 0.05$ where RS is the product (RL·RH) of the total length RL of the side faces in a pixel as viewed from the normal to the liquid crystal layer and the height RH of the ribs, and PS is the pixel area.

13 Claims, 20 Drawing Sheets

LIQUID CRYSTAL DISPLAY DEVICE

BACKGROUND OF THE INVENTION

The present invention relates to a liquid crystal display device, and more specifically, to a liquid crystal display device of an alignment-divided vertical alignment type that permits display of a high contrast ratio and has a wide viewing angle characteristic.

In recent years, liquid crystal display devices (LCDs) have increasingly come into widespread use. Among various types of LCDs, mainstream has been a TN LCD in which a nematic liquid crystal material having positive dielectric anisotropy is twisted. The TN LCD however has a problem of being large in visual angle dependence that results from the alignment of liquid crystal molecules.

To improve the visual angle dependence, alignment-divided vertical alignment LCDs have been developed, and use of these LCDs is expanding. For example, Japanese Patent Publication No. 2947350 (Literature 1) discloses an MVA LCD as one of the alignment-divided vertical alignment LCDS. The MVA LCD, which includes a vertical alignment liquid crystal layer placed between a pair of electrodes to present display in the normally black (NB) mode, is provided with domain regulating means (for example, slits and/or protrusions) to enable liquid crystal molecules in each pixel to fall (tilt) in a plurality of different directions during application of a voltage.

Recently, needs for displaying moving image information have rapidly increased, not only in LCD TVs, but also in PC monitors and portable terminal equipment (such as mobile phones and PDAs). To display moving images with high definition on LCDs, it is necessary to shorten the response time (increase the response speed) of the liquid crystal layer, so that a predetermined grayscale level can be reached within one vertical scanning period (typically, one frame).

As one method for improving the response characteristic of an MVA LCD, it is conceivable to increase the entire length of ribs placed in each pixel or increase the height of such ribs. That is, by increasing the entire area of slope faces of ribs that are in contact with the liquid crystal layer, the alignment regulating force against the liquid crystal layer can be enhanced, and this improves the response characteristic (Literature 1).

Increasing the area of slope faces of ribs however reduces the contrast ratio because the luminance in the black display state (called "black luminance" in some cases) increases near slope faces of ribs, as described in Literature 1 (see FIGS. 28 to 32 of this literature, for example). Literature 1 describes that as a result of evaluation of LCDs having 0.7 μm to 2.0 μm high ribs placed in both surface portions of the liquid crystal layer, the reduction in contrast ratio was of a level so low that no problem would be presented in actual observation.

However, according to examinations by the present inventors, the area of slope faces of ribs is a bit factor that substantially determines the black luminance, and thus it is not easy to improve the response characteristic while securing a contrast ratio of a given level (700:1 or higher, for example).

In view of the above, a main object of the present invention is providing an alignment-divided vertical alignment LCD that can improve its response characteristic while suppressing reduction in contrast ratio.

SUMMARY OF THE INVENTION

The liquid crystal display device of the present invention includes: a pair of polarizing plates placed so that their transmission axes are orthogonal to each other; and a plurality or an array of pixels provided between the pair of polarizing plates, wherein each of the plurality of pixels has a first electrode, a second electrode facing the first electrode, a vertical alignment liquid crystal layer placed between the first and second electrodes, and ribs placed in a surface portion of the liquid crystal layer close to the first electrode and/or a surface portion thereof close to the second electrode, and the ribs extend in a direction roughly 45° with respect to the transmission axis of one of the pair of polarizing plates, have slope side faces put in contact with the liquid crystal layer, and satisfy the relationships $RL/PS \geq 0.05$ ($\mu m^{-1}$) and $RS/PS \leq 0.05$ where RS is a product ($RL \cdot RH$) of a total length RL of the side faces in a pixel as viewed from the normal to the liquid crystal layer and a height RH of the ribs, and PS is a pixel area.

In one embodiment, $RS/PS \leq 0.04$.

In another embodiment, the height RH of the ribs is preferably 1 μm or less.

In yet another embodiment, the thickness of the liquid crystal layer is preferably less than 3 μm.

In yet another embodiment, the ribs are stripe-shaped ribs having a first width placed in the surface portion of the liquid crystal layer close to the first electrode, and the pixel further has stripe-shaped slits having a second width formed through the second electrode and stripe-shaped liquid crystal regions having a third width each defined between the adjacent rib and slit.

In yet another embodiment, the third width is preferably in a range between 2 μm and 14 μm, and more preferably 12 μm or less.

In yet another embodiment, preferably, the first width is in a range between 4 μm and 20 μm, and the second width is in a range between 4 μm and 20 μm.

In yet another embodiment, the first electrode is a counter electrode, and the second electrode is a pixel electrode.

In yet another embodiment, the second width/thickness of the liquid crystal layer is 3 or more.

In yet another embodiment, the third width/second width is 1.5 or less.

The electronic equipment of the present invention includes the liquid crystal display device described above.

In one embodiment, the equipment further includes a circuit for receiving television broadcast.

In the alignment-divided vertical alignment LCD having ribs of the present invention, the conditions of placement of the ribs (proportions of the length and the slope area of the ribs with respect to the pixel area) are set to fall in respective predetermined ranges. Therefore, a high contrast ratio and an improved response characteristic are achieved. Moreover, according to the present invention, an alignment-divided vertical alignment LCD that can present a high-definition moving image display when OS driving is adopted is provided.

The LCD of the present invention is suitably usable as an LCD TV by being provided with a circuit for receiving television broadcast (e.g., via satellite, cable, and/or electromagnetic waves, etc.). Also, the LCD of the present invention is suitably applicable to electronic equipment used for display of moving images, such as personal computers and PDAs.

DETAILED DESCRIPTION OF THE INVENTION

Figure 1A:
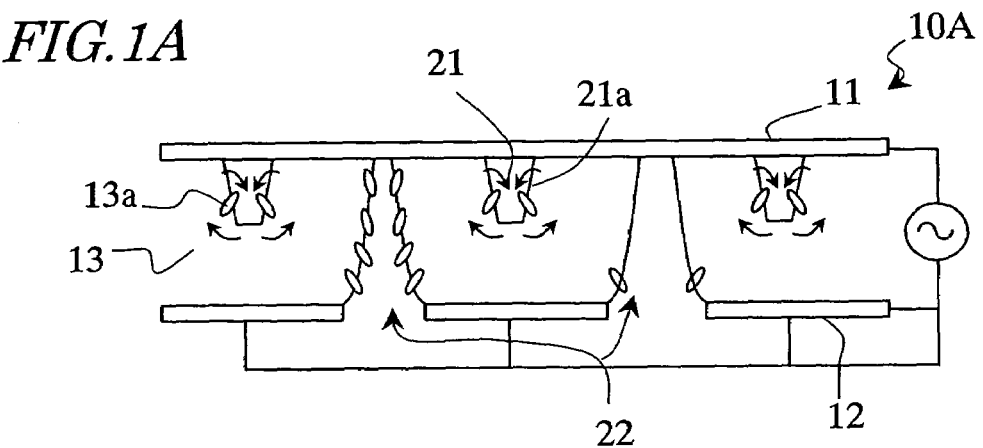
FIGS. 1A, 1B and 1C are cross-sectional views diagrammatically showing basic configurations of MVA LCDs of embodiments of the present invention.

Hereinafter, LCDs of embodiments of the present invention and driving methods for the LCDs will be described with reference to the relevant drawings.

First, the configuration of an alignment-divided vertical alignment LCD of an embodiment of the present invention will be described with reference to FIG. 1A.

The LCD 10A of the embodiment of the present invention includes a plurality of pixels each having a first electrode 11, a second electrode 12 facing the first electrode 11, and a vertical alignment liquid crystal layer 13 placed between the first electrode 11 and the second electrode 12. The vertical alignment liquid crystal layer 13 includes liquid crystal molecules having negative dielectric anisotropy that are aligned roughly vertically (for example, at an angle in the range between 87° and 90°) with respect to the plane of the first and second electrodes 11 and 12 during non-voltage application (or voltage application below the threshold voltage). Typically, this alignment is attained by providing a vertical alignment film (not shown) on each of the surfaces of the first and second electrodes 11 and 12 facing the liquid crystal layer 13. Ribs (or protrusions) and/or the like may be provided as alignment regulating means, and in this case, liquid crystal molecules are aligned roughly vertically with respect to the surfaces of the ribs and the like facing the liquid crystal layer since the vertical alignment film is also provided over the ribs or protrusions.

Ribs 21 are provided in a surface portion of the liquid crystal layer 13 close to the first electrode 11 while slits 22 are provided in a surface portion of the liquid crystal layer 13 close to the second electrode 12. In liquid crystal regions defined between the ribs 21 and the slits 22, liquid crystal molecules 13a are under alignment regulating force applied from the ribs 21 and the slits 22. Once a voltage above a threshold voltage is applied between the first and second electrodes 11 and 12, the liquid crystal molecules 13a fall (tilt) in the directions shown by the arrows in FIG. 1A. That is, in each of the liquid crystal regions between regulating means, liquid crystal molecules fall in a uniform direction. Such liquid crystal regions can therefore be regarded as domains.

The ribs 21 and the slits 22 (hereinafter, these are collectively called "alignment regulating means" in some cases; the alignment regulating means correspond to the domain regulating means described in Literature 1 mentioned above) are placed in a stripe shape in each pixel. FIG. 1A is a cross-sectional view taken orthogonal to the extension of the stripe-shaped alignment regulating means. Liquid crystal regions (domains) in which liquid crystal molecules 13a fall in directions different by approximately 180° from each other are formed on both sides of each alignment regulating means.

In the LCD 10A, the ribs 21 and the slits 22 extend in a stripe shape. The ribs 21 serve to align liquid crystal molecules 13a roughly vertically with respect to the side faces of the ribs 21, so that the liquid crystal molecules 13a are aligned in a direction orthogonal to the extension of the ribs 21. The slits 22 serve to generate a tilt electric field in areas of the liquid crystal layer 13 near the edges of the slits 22 when a potential difference is given between the first and second electrodes 11 and 12, so that the liquid crystal molecules 13a are aligned in a direction orthogonal to the extension of the slits 22. The ribs 21 and the slits 22 are placed in parallel with each other with a predetermined spacing therebetween, and liquid crystal regions (domains)

are formed between the ribs 21 and the slits 22 adjacent to each other. That is, the liquid crystal layer 13 in each pixel region is alignment-divided.

Figure 1B:
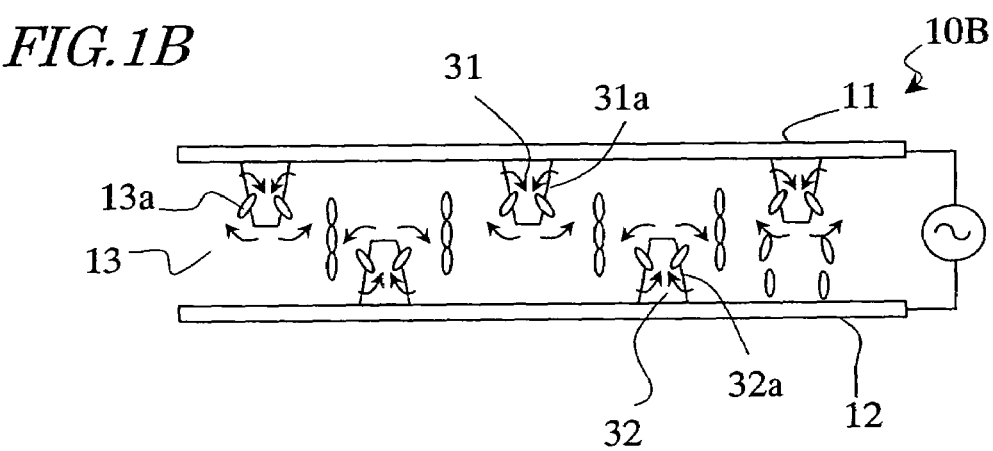
Figure 1C:
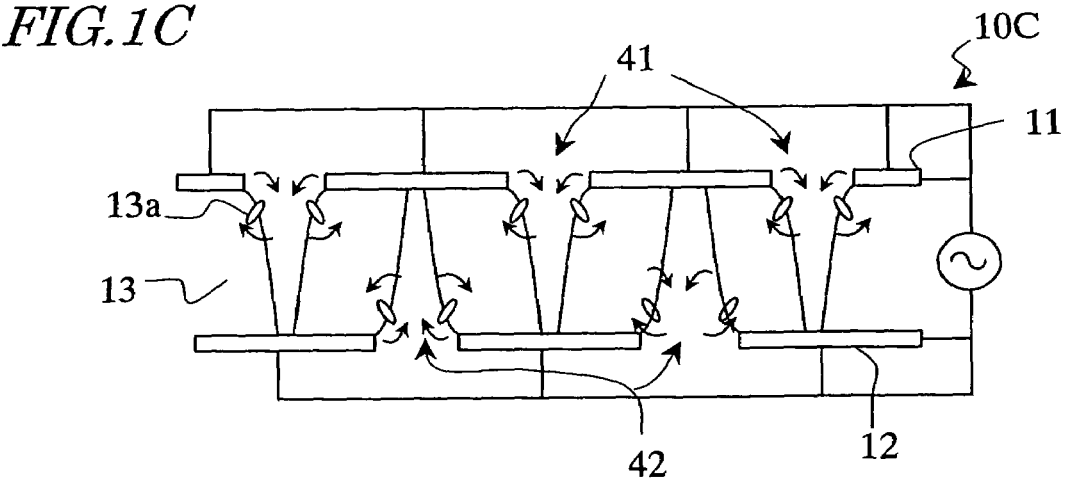

Configurations shown in FIGS. 1B and 1C are also known as MVA LCDs. In the following description of the present invention, however, the configuration shown in FIG. 1A is adopted for the reason described below.

An LCD 10B of FIG. 1B is different from the LCD 10A of FIG. 1A in that ribs 31 and 32 are provided as the first and second alignment regulating means in both surface portions of the liquid crystal layer 13. The ribs 31 and 32 are placed in parallel with each other with a predetermined spacing therebetween, and serve to align liquid crystal molecules 13a roughly vertically with respect to side faces 31a of the ribs 31 and side faces 32a of the ribs 32, to thereby form liquid crystal regions (domains) between these ribs.

An LCD 10C of FIG. 1C is different from the LCD 10A of FIG. 1A in that slits 41 and 42 are provided as the first and second alignment regulating means in both surface portions of the liquid crystal layer 13. The slits 41 and 42 serve to generate a tilt electric field in areas of the liquid crystal layer 13 near the edges of the slits 41 and 42 when a potential difference is given between the first and second electrodes 11 and 12, so that liquid crystal molecules 13a are aligned in a direction orthogonal to the extension of the slits 41 and 42. The slits 41 and 42 are placed in parallel with each other with a predetermined spacing therebetween, and liquid crystal regions (domains) are formed between these slits.

The LCD 10A of this embodiment uses the ribs 21 and the slits 22 as the alignment regulating means provided in both surface portions of the liquid crystal layer. This configuration can suppress increase of black luminance caused by the alignment regulating force of the slopes of the ribs, compared with the configuration of LCD 10B using the ribs 31 and 32 in both surface portions of the liquid crystal layer 13.

The configuration of the LCD 10A shown in FIG. 1A has another advantage of minimizing increase of the number of fabrication steps. No additional step is required in forming slits through the pixel electrode. As for the counter electrode, increase of the number of steps is smaller in placing ribs thereon than in forming slits therethrough. The first and second electrodes 11 and 12 may be electrodes facing each other with the liquid crystal layer 13 therebetween. Typically, one electrode is a counter electrode, and the other is a pixel electrode. Note herein that the embodiments of the present invention will be described taking the case of using a counter electrode and a pixel electrode as the first and second electrodes 11 and 12, respectively, as an example.

Prototypes of LCDs having the basic configuration shown in FIG. 1A but different in cell parameters were fabricated, to examine the relationship between the black luminance and the response characteristic.

Figure 2:
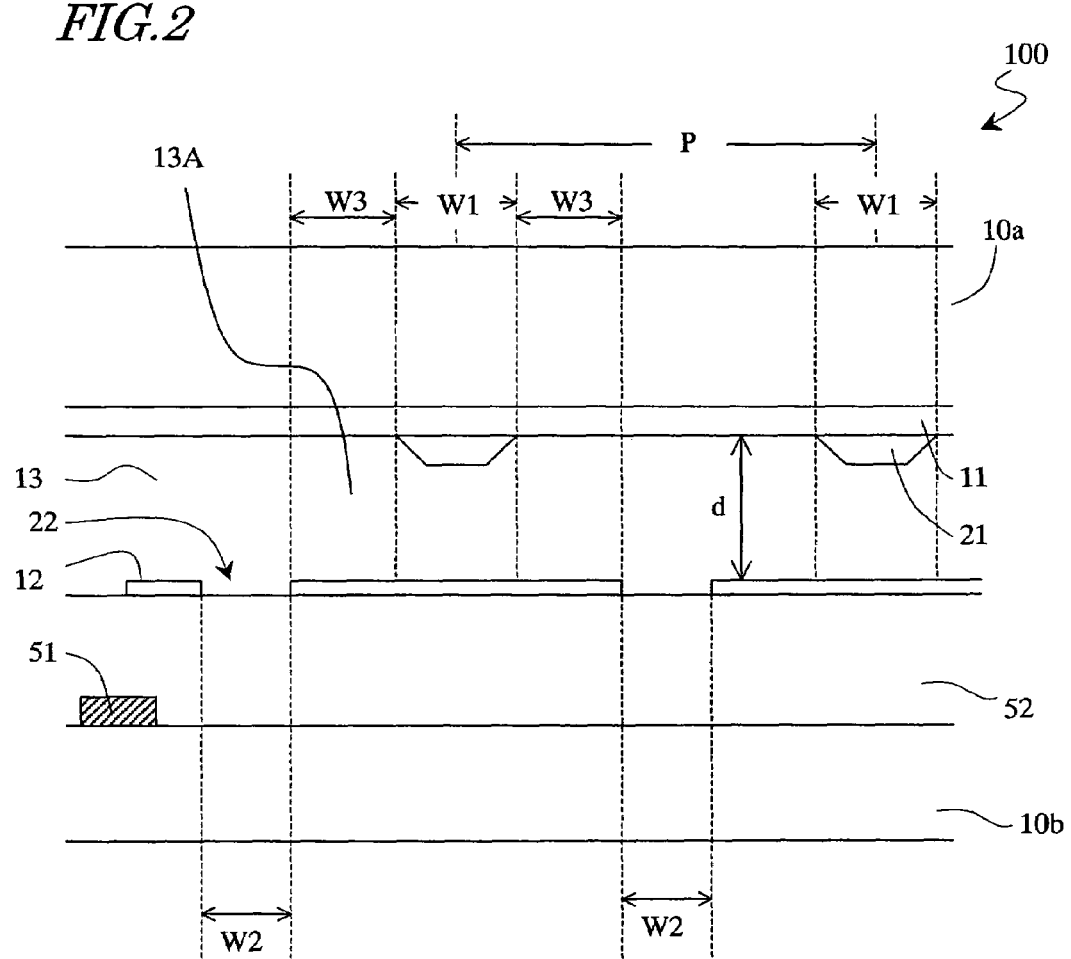
FIG. 2 is a partial cross-sectional view diagrammatically showing the sectional structure of an LCD 100 of an embodiment of the present invention.
Figure 3:
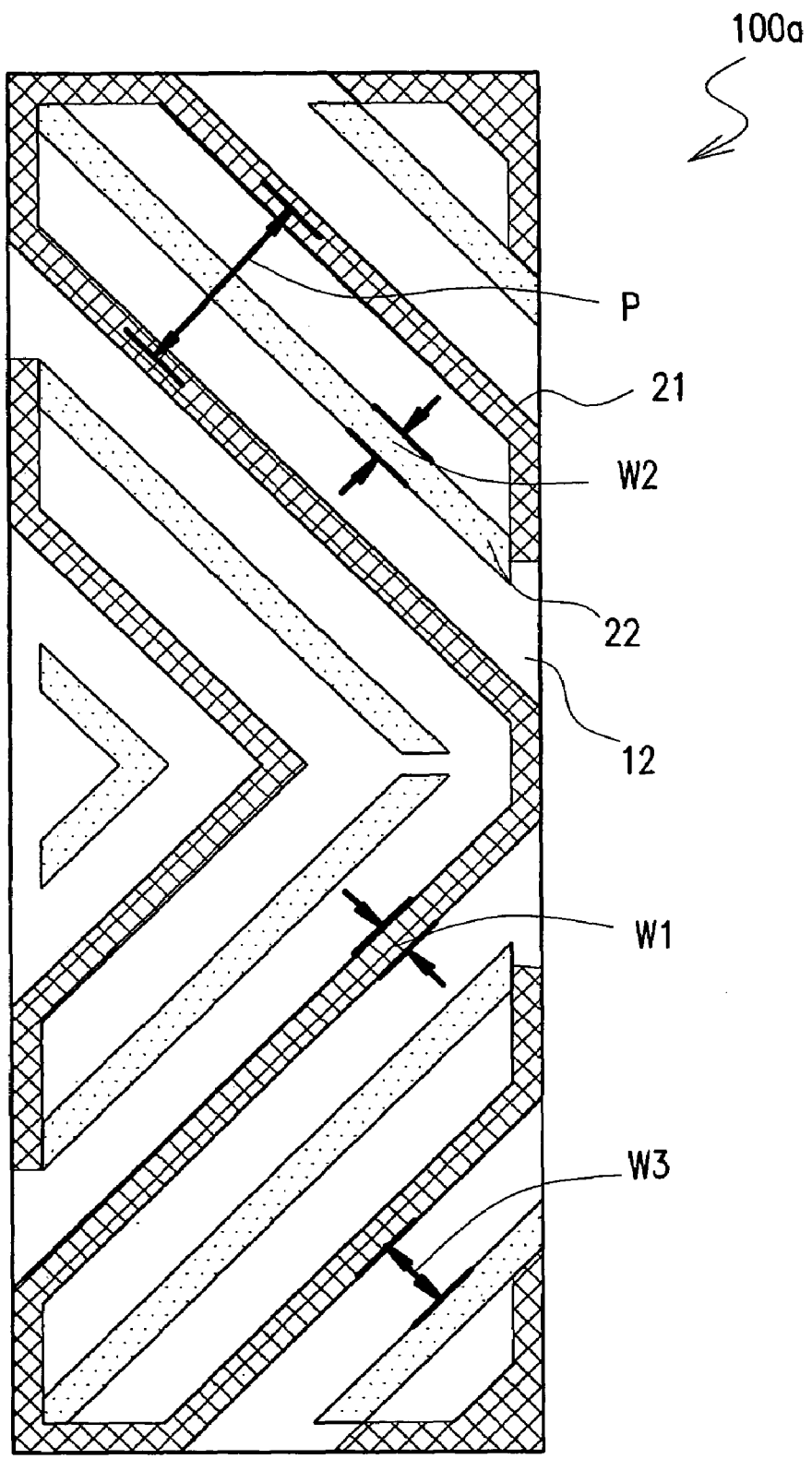
FIG. 3 is a diagrammatic plan view of a pixel portion 100a of the LCD 100.

First, the basic configuration of the LCD of the embodiment of the present invention will be described with reference to FIGS. 2 and 3. FIG. 2 is a partial cross-sectional view diagrammatically showing the sectional structure of an LCD 100 of the present invention, and FIG. 3 is a plan view of a pixel portion 100a of the LCD 100. The LCD 100 is substantially the same in basic configuration as the LCD 10A of FIG. 1A. Common components are therefore denoted by the same reference numerals.

The LCD 100 has a vertical alignment liquid crystal layer 13 between a first substrate (for example, glass substrate) 10a and a second substrate (for example, glass substrate) 10b. A counter electrode 11 is formed on the surface of the first substrate 10a facing the liquid crystal layer 13, and ribs 21 are formed on the counter electrode 11. A vertical alignment film (not shown) is formed covering substantially the entire surface of the counter electrode 11 including the ribs 21 facing the liquid crystal layer 13. The ribs 21 extend in a stripe shape as shown in FIG. 3 so that the adjacent ribs 21 are substantially in parallel with each other with a substantially uniform spacing (pitch) P therebetween. The width W1 of the ribs 21 (width in the direction orthogonal to the extension) is also uniform.

Gate bus lines (scanning lines) and source bus lines (signal lines) 51, as well as TFTs (not shown), are formed on the surface of the second substrate 10b facing the liquid crystal layer 13, and an interlayer insulating film 52 is formed to cover these components. The interlayer insulating film 52, which has a flat surface, is made of a transparent resin film or the like having a thickness in the range between 1.5 μm and 3.5 μm, to thereby enable overlap placement of a pixel electrode 12 with the gate bus lines and/or the source bus lines. This gives an advantage of improving the aperture ratio.

Stripe-shaped slits 22 are formed through the pixel electrode 12, and a vertical alignment film (not shown) is formed covering substantially the entire surface of the pixel electrode 12 including the slits 22. As shown in FIG. 3, the slits 22 extend in a stripe shape in parallel with each other so as to roughly bisect the spacing between the adjacent ribs 21. The width W2 of the slits 22 (width in the direction orthogonal to the extension) is substantially uniform. The shapes and arrangements of the slits and ribs described above may deviate from the respective design values in some cases due to a variation in fabrication process, misalignment in bonding of the substrates and the like. The above description does not exclude these deviations.

A stripe-shaped liquid crystal region 13A having a width W3 is defined between an adjacent stripe-shaped rib 21 and slit 22 extending in parallel with each other. In the liquid crystal region 13A, the alignment direction is regulated with the rib 21 and the slit 22 placed on both sides of the region. Such liquid crystal regions (domains) are formed on the opposite sides of each of the ribs 21 and the slits 22, in which liquid crystal molecules 13a tilt in the directions different by approximately 180° from each other. As shown in FIG. 3, in the LCD 100, the ribs 21 and the slits 22 extend in two directions different by about 90° from each other, and each pixel portion 100a has four types of liquid crystal regions 13A different in the alignment direction of liquid crystal molecules 13a by about 90° from one another. Although the arrangement of the ribs 21 and the slits 22 is not limited to the example described above, this arrangement ensures good viewing angle characteristic.

A pair of polarizing plates (not shown) are placed on the outer surfaces of the first and second substrates 10a and 10b so that the transmission axes thereof are roughly orthogonal to each other (in the crossed-Nicols state). If the polarizing plates are placed so that the transmission axes thereof form about 45° with the alignment directions of all the four types of liquid crystal regions 13A that are different by about 90° from one another, a change in retardation with the liquid crystal regions 13A can be utilized most efficiently. Therefore, the polarizing plates should preferably be placed so that the transmission axes thereof form roughly 45° with the directions of extension of the ribs 21 and the slits 22. In display devices in which observation is often moved in a direction horizontal to the display plane, such as TVs, the transmission axis of one of the polarizing plates preferably extends in a direction horizontal to the display plane for suppression of the viewing angle dependence of the display quality. In the following examination, the retardation of the liquid crystal layer (product Δn·d of the birefringence Δn and the thickness d of the liquid crystal layer) was kept at about 300 nm irrespective of the thickness d, and the rib and slits were made to extend in the directions about 45° with respect to the transmission axes of the polarizing plates.

Prototypes of 13-inch VGA LCDs (prototype LCDs 1 to 18) having the basic configuration described above, different in cell parameters, were actually fabricated, to examine the display characteristics and the response characteristic. Table 1 below shows part of the examination results, in which the black luminance and the contrast ratio were evaluated as the display characteristics. As the cell parameters, Table 1 shows, in addition to the thickness d of the liquid crystal layer, the rib pitch P, the rib width W1, the slit width W2 and the width W3 of the liquid crystal region (LC region width (ITO width) W3), the rib length RL, the rib height RH, the product RS of the rib length RL and the rib height RH, and the ratios of RL and RS to the pixel area PS. The pixel area PS is an area obtained by subtracting the area of light-shading portions (area of portions shaded with the bus lines and the black matrix=22015.7 μm) from the area of one pixel section (for example, the pitch in the row direction×the pitch in the column direction=138 μm×144 μm), including the portions of the ribs 21 and the slits 22. The values of the thickness d of the liquid crystal layer, the rib pitch P, the rib width W1, the slit width W2, the LC region width (ITO width) W3 and the rib height RH are actually measured values, while the values of the rib pitch P and the rib length RL are design values.

Figure 4A:
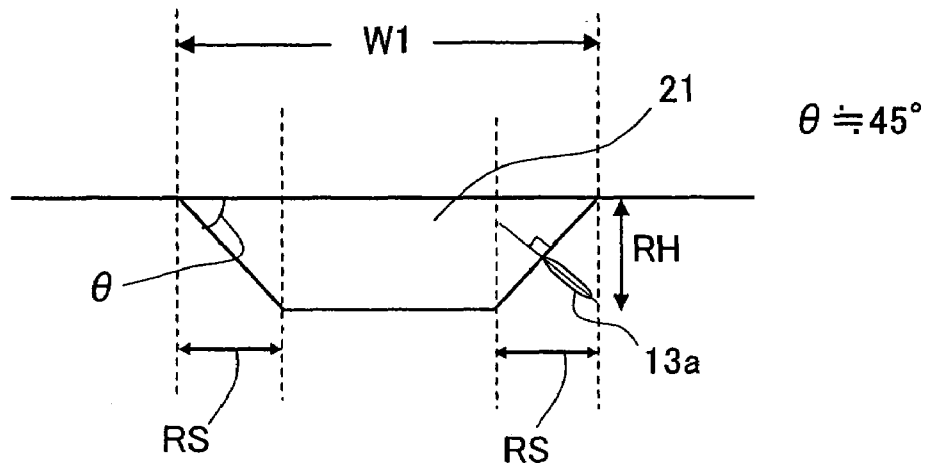
FIGS. 4A, 4B and 4C are diagrammatic cross-sectional views of ribs 21 having inclination angles θ≈45° (4A), θ<45° (4B) and θ>45° (4C), taken in the direction orthogonal to the rib extension.

The rib length RL refers to the total length of the slopes of the ribs that exist in each pixel and exert the alignment regulating force on the liquid crystal layer. It should be noted that although each rib 21 has two slopes, the two slopes do not necessarily exert the alignment regulating force on liquid crystal molecules existing in the pixel. The inclination angle θ of the slopes of the ribs 21 of the prototype LCDs used in this examination is roughly 45° as diagrammatically shown in FIG. 4A. Therefore, the value RS given by the rib height RH×the rib length RL corresponds to the projective area of the slopes of the ribs 21 on the substrate plane (this area is also called the "rib slope area" simply in some cases). The inclination angle θ of the slopes of the ribs 21 is not limited to about 45°, and moreover, the cross-sectional shape of the ribs 21 is not limited to the trapezoid. The cross-sectional shape of the ribs 21 changes with the kind and thickness (degree of development) of a photosensitive polymer used for formation of the ribs 21. As will be recognized from the examination results to be described later, the value RS given by the rib height RH×the rib length RL has a strong correlation with the black luminance. The reason for this is as follows.

Figure 4B:
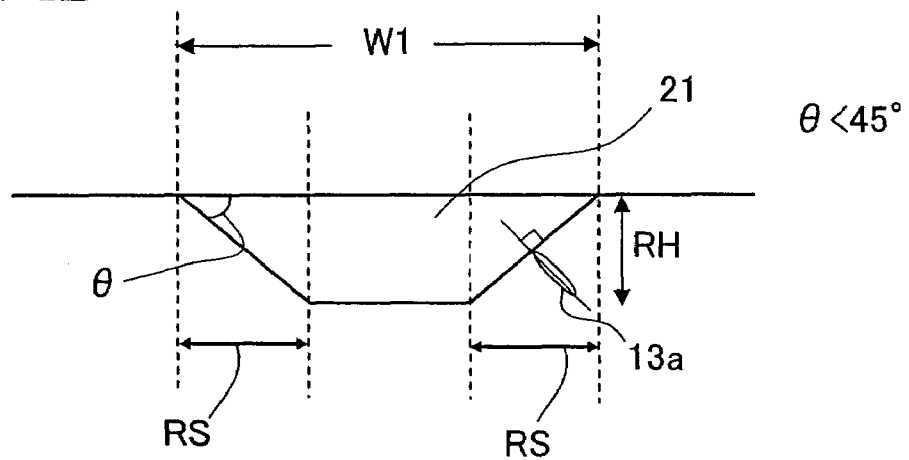

When the inclination angle θ of the rib 21 is smaller than 45° as shown in FIG. 4B, the rib slope area is greater than that when the inclination angle θ is 45°However, the alignment of liquid crystal molecules 13a alignment-regulated with the rib slope is closer to the vertical alignment. Therefore, the effect of increasing the black luminance obtained from the greater rib slope area and the effect of reducing the black luminance obtained from the alignment of liquid crystal molecules 13a closer to the vertical alignment cancel each other, resulting in the black luminance equivalent to the case of the inclination angle θ of the rib 21 of 45°.

Figure 4C:
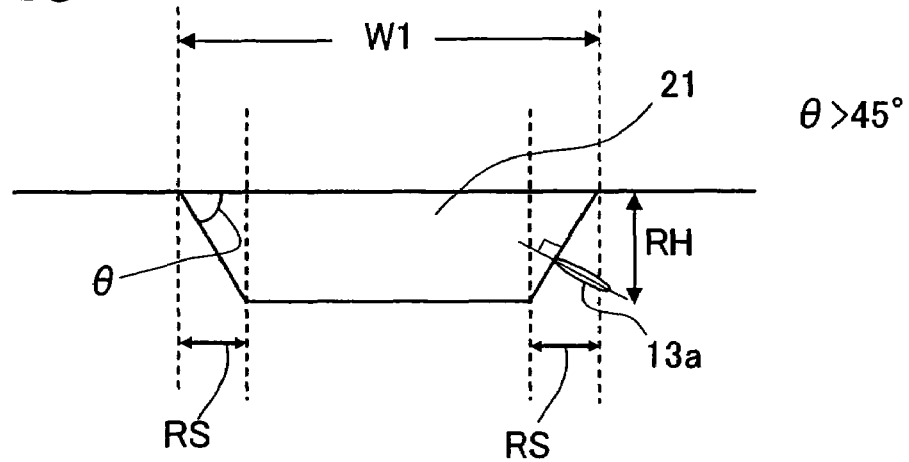

In reverse, when the inclination angle θ of the rib 21 is larger than 45° as shown in FIG. 4C, the rib slope area is smaller than that when the inclination angle θ is 45°However, the alignment of liquid crystal molecules 13a alignment-regulated with the rib slope is farther from the vertical alignment. Therefore, the effect of reducing the black luminance obtained from the smaller rib slope area and the effect of increasing the black luminance obtained from the alignment of liquid crystal molecules 13a farther from the vertical alignment cancel each other., resulting in the black luminance equivalent to the case of the inclination angle θ of the rib 21 of 45°.

As described above, the effect of increasing the black luminance with the slope of the rib 21 is irrelevant to the inclination angle θ. That is, substantially the same effect as that obtained when the inclination angle θ is 45° is obtained irrespective of the change of the inclination angle θ. A good relationship is however established between RS and the black luminance as will be described below irrespective of the inclination angle θ.

TABLE 1

| Prototype LCD No. | LC layer thickness d[μm] | Rib pitch P[μm] | Rib width W1[μm] | Slit width W2[μm] | LC region width W3[μm] | Rib length RL[μm] | Rib height RH[μm] | Rib slope area RS [μm$^2$] | RL/PS [μm$^{-1}$] | RS/PS [-] | Black display Transmittance | Contrast ratio CR |
|---|---|---|---|---|---|---|---|---|---|---|---|---|
| 1 | 2.8 | 26.5 | 5.7 | 4.8 | 8.0 | 2813 | 1.38 | 3882 | 0.0801 | 0.1105 | 0.0381 | 328 |
| 2 | 2.8 | 36.1 | 7.8 | 6.2 | 11.1 | 2065 | 1.38 | 2850 | 0.0588 | 0.0812 | 0.0246 | 418 |
| 3 | 3.9 | 39.6 | 7.8 | 9.7 | 11.1 | 1894 | 1.38 | 2614 | 0.0539 | 0.0744 | 0.0233 | 507 |
| 4 | 2.8 | 39.6 | 7.8 | 9.7 | 11.1 | 1894 | 1.38 | 2614 | 0.0539 | 0.0744 | 0.0235 | 472 |
| 5 | 2.8 | 46.0 | 10.0 | 8.3 | 13.9 | 1598 | 1.38 | 2205 | 0.0455 | 0.0628 | 0.0200 | 530 |
| 6 | 2.8 | 46.0 | 7.8 | 6.2 | 16.0 | 1598 | 1.38 | 2205 | 0.0455 | 0.0628 | 0.0223 | 461 |
| 7 | 2.8 | 49.5 | 7.8 | 9.7 | 16.0 | 1449 | 1.38 | 1999 | 0.0413 | 0.0569 | 0.0198 | 557 |
| 8 | 3.9 | 53.0 | 11.7 | 9.7 | 15.8 | 1403 | 1.38 | 1936 | 0.0399 | 0.0551 | 0.0164 | 696 |
| 9 | 2.8 | 53.0 | 11.7 | 9.7 | 15.8 | 1403 | 1.38 | 1936 | 0.0399 | 0.0551 | 0.0186 | 601 |
| 10 | 2.8 | 53.0 | 7.8 | 6.2 | 19.5 | 1393 | 1.38 | 1922 | 0.0397 | 0.0547 | 0.0178 | 668 |
| 11 | 2.8 | 56.6 | 7.8 | 9.7 | 19.55 | 1320 | 1.38 | 1821 | 0.0376 | 0.0519 | 0.0166 | 680 |
| 12 | 2.8 | 26.5 | 4.9 | 4.8 | 8.4 | 2819 | 0.58 | 1635 | 0.0803 | 0.0466 | 0.0153 | 869 |
| 13 | 2.8 | 36.1 | 7.0 | 6.2 | 11.5 | 2069 | 0.58 | 1200 | 0.0589 | 0.0342 | 0.0085 | 947 |
| 14 | 2.8 | 39.6 | 7.0 | 9.7 | 11.5 | 1899 | 0.58 | 1101 | 0.0541 | 0.0314 | 0.0093 | 1332 |
| 15 | 2.3 | 39.6 | 7.0 | 9.7 | 11.5 | 1899 | 0.58 | 1101 | 0.0541 | 0.0314 | 0.0098 | 1308 |
| 16 | 2.8 | 46.0 | 9.2 | 8.3 | 14.3 | 1600 | 0.58 | 928 | 0.0456 | 0.0264 | 0.0075 | 1533 |
| 17 | 2.8 | 53.0 | 10.9 | 9.7 | 16.2 | 1403 | 0.58 | 813 | 0.0399 | 0.0232 | 0.0081 | 1610 |
| 18 | 2.3 | 53.0 | 10.9 | 9.7 | 16.2 | 1403 | 0.58 | 813 | 0.0399 | 0.0232 | 0.0089 | 1368 |

(Note)
PS: Pixel area [μm$^2$]

Among the prototype LCDs 1 to 18 shown in Table 1, the prototype LCD 8 has the same cell parameters as those of typical MVA LCDs currently available as liquid crystal TVs. As one of methods for improving the response characteristic of this prototype LCD, increasing the rib slope area RS of the ribs 21 is considered as described in Literature 1. Increasing the rib slope area, however, may lead to increase in black display transmittance (black luminance) and reduction in contrast ratio.

Figure 5:
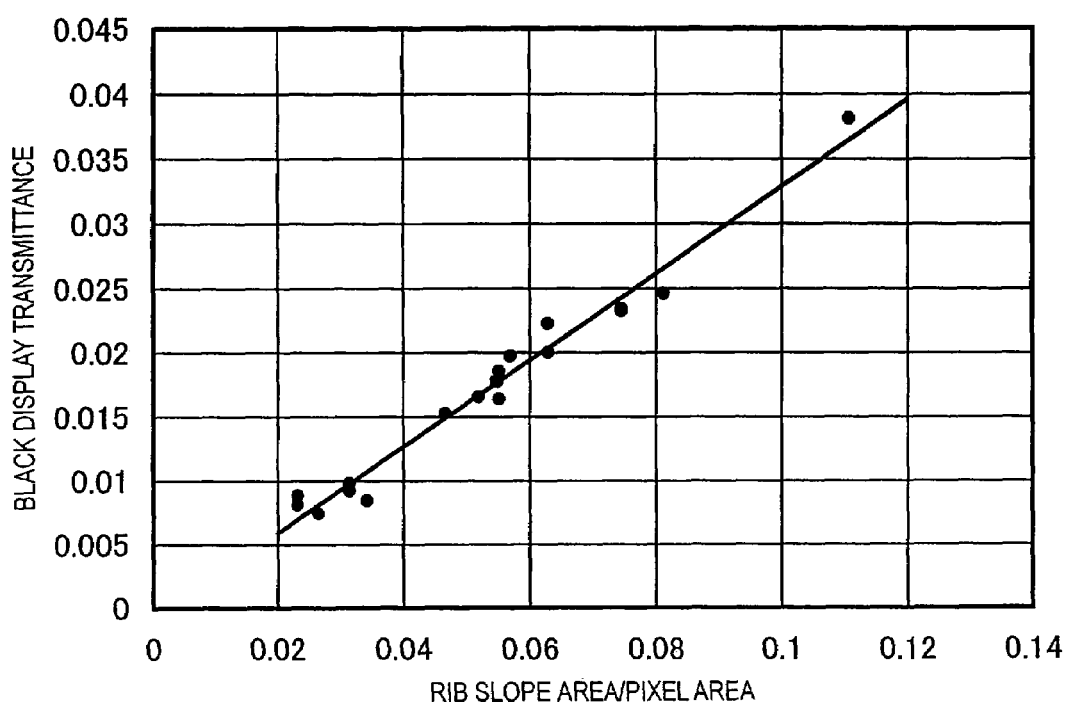
FIG. 5 is a graph showing the relationship between the rib slope area RS/pixel area PS and the black display transmittance for prototype LCDs.
Figure 6:
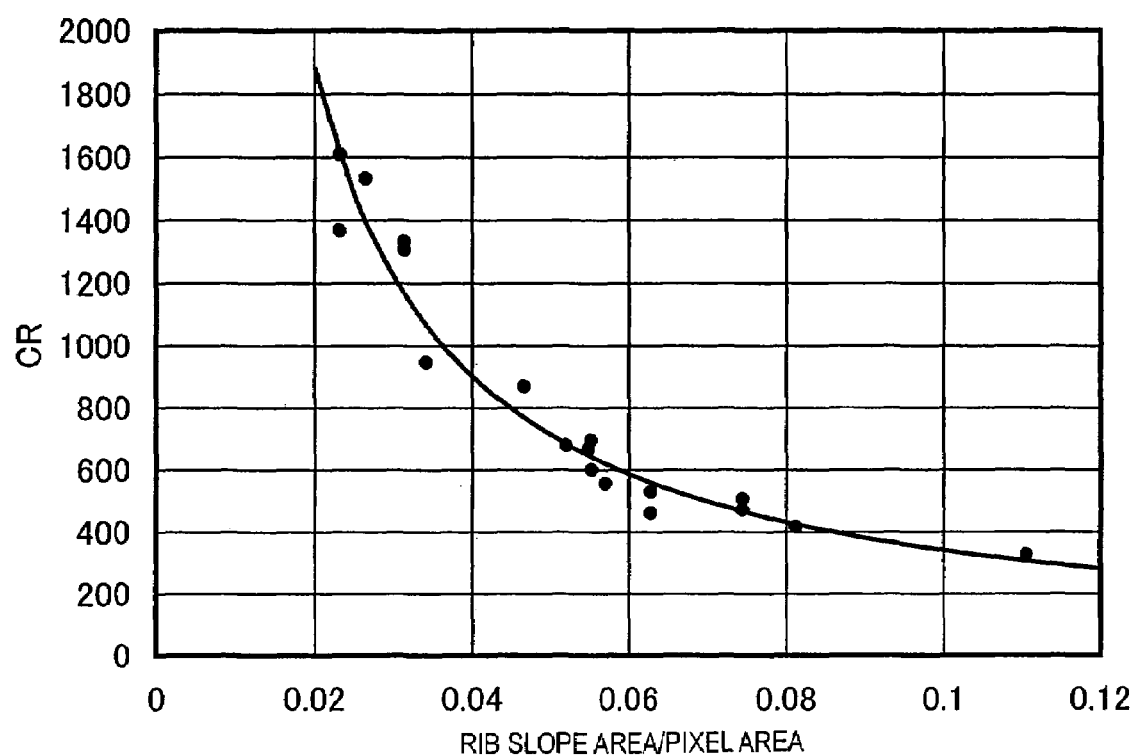
FIG. 6 is a graph showing the relationship between the rib slope area RS/pixel area PS and the contrast ratio for prototype LCDs 1 to 18.

FIGS. 5 and 6 show the relationships between the rib slope area RS/pixel area PS and the black display transmittance (absolute value) and between the rib slope area RS/pixel area PS and the contrast ratio, respectively, for the prototype LCDs 1 to 18.

As is apparent from FIG. 5, definite proportional (linear) relationship is recognized between the rib slope area RS/pixel area PS and the black display transmittance. This indicates that simply increasing the rib slope area RS for improving the response speed is undesirable because this leads to increase in black display transmittance and reduction in contrast ratio. Reduction in contrast ratio is not negligible when the LCDs are used as liquid crystal TVs and the like. As in the prototype LCD 8 described above, for example, the contrast ratio is preferably maintained at 700:1.

Hereinafter, the effect of improving the response characteristic with the ribs 21 is discussed. The slopes of the ribs 21 exert the alignment regulating force on liquid crystal molecules. Accordingly, if the area of the slopes is made large by increasing the height or length of the ribs, the response characteristic will be improved. Either the height or length of the ribs may be increased to make the area of the slopes large. However, as described in Literature 1, increasing the length of the ribs is more advantageous than increasing the height of the ribs, for the following reason.

In the alignment-divided vertical alignment LCDs, alignment division is made with the alignment regulating means (the ribs 21 and the slits 22) placed linearly (one-dimensionally). Increasing the length of the ribs 21 corresponds to dividing each pixel into a larger number of regions, while increasing the height of the ribs 21 corresponds to enhancing the alignment regulating force of the slopes of the ribs 21. With the higher ribs 21, the number of liquid crystal molecules subjected to the alignment regulating force of the rib slopes increases in the direction of the thickness of the liquid crystal layer. This indicates that the density of the liquid crystal molecules subjected to the alignment regulating force of the ribs 21 increases when viewed in the plane of the pixel. To discuss the above in association with the response characteristic of the display, increasing the length of the ribs 21 corresponds to increasing the number of regions that respond fast under the alignment regulating force of the ribs 21, while increasing the height of the ribs 21 corresponds to further increasing the response speed of the regions already subjected to the alignment regulating force.

As is understood from the above discussion, for improvement of the response characteristic of the display actually observed, increasing the number of regions that respond fast is effective, and for this, increasing the length of the ribs 21 is preferred. In view of this, it is understood that to obtain a more improved response characteristic than that of the prototype LCD 8, the length of the ribs 21 must be made larger than that of the prototype LCD 8, and also to maintain the contrast ratio of the prototype LCD 8, the slope area of the ribs 21 must be made smaller than that of the prototype LCD 8. Naturally, as the length and slope area of the ribs 21, those standardized with respect to the pixel area must be considered.

From Table 1, it is found that the prototype LCDs 12 to 16 satisfy the conditions of having RL/PS larger than the prototype LCD 8 and RS/PS smaller than the prototype LCD 8. These prototype LCDs satisfy RL/PS≧0.05 and RS/PS≦0.05 and have a contrast ratio of 800 or higher. Moreover, the prototype LCDs 13 to 16 satisfy RS/PS≦0.04 and have a contrast ratio of 900 or higher.

Also, as described above, decreasing the height RH of the ribs 21 is effective to satisfy RL/PS≧0.05 and RS/PS≦0.05. The height RH is preferably 1 µm or less.

Although MVA LCDs having ribs and slits were taken as an example in the above description of the present invention, the problem that the black luminance increases with placement of ribs is common in LCDs in which liquid crystal molecules alignment-regulated with the rib slopes cause light leakage, not limited to the MVA LCDs described above. In other words, the configuration described above is applicable to any alignment-divided vertical alignment LCDs having stripe-shaped ribs extending in directions 45° with respect to the transmission axes of a pair of polarizing plates placed in the crossed-Nicols state, to obtain the effect described above. For example, for LCDs having ribs in both surface portions of the liquid crystal layer, all the ribs in each pixel may be placed to satisfy RL/PS≧0.05 and RS/PS≦0.05. Strictly speaking, the degree of the light leakage due to the tilt of liquid crystal molecules depends on the retardation of the liquid crystal layer. Therefore, to obtain the level of contrast ratio described herein, it is preferred to use a liquid crystal layer having a retardation close to the retardation (about 300 nm) of the liquid crystal layer used herein (that is, about 270 nm to about 330 nm).

Figure 20A:
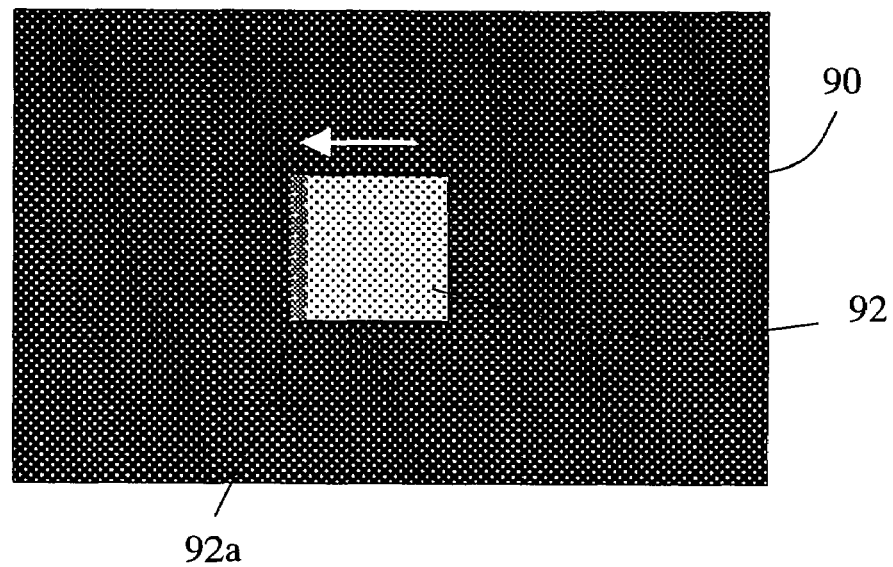
FIGS. 20A and 20B are diagrammatic views for demonstrating a problem related to moving image display in an MVA LCD.
Figure 20B:
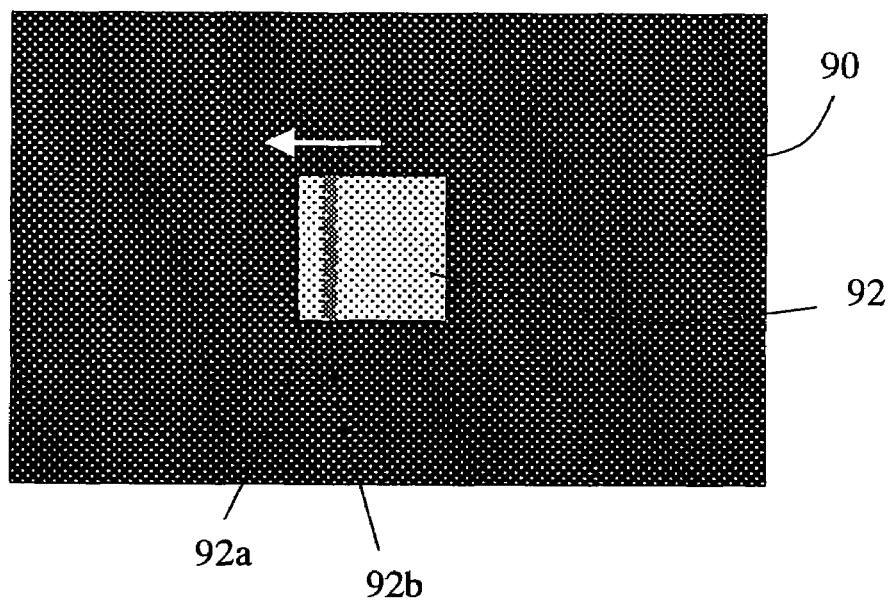

If the MVA LCD 100 has the same cell parameters as those of the prototype LCD 8, a phenomenon shown in FIG. 20B may arise when OS driving is done. An LCD having cell parameters of the prototype LCD 8 is herein called a conventional LCD in some cases.

FIGS. 20A and 20B are views diagrammatically showing how the display looks like when a square 92 of a certain grayscale level (for example, level 32/255) is moved in a black background 90 (for example, level 0), observed when a conventional MVA LCD is driven by a normal driving method (FIG. 20A) and by OS driving (FIG. 20B). Note that the "level 32/255" is a grayscale level giving a luminance of $(32/255)^{2.2}$ with respect to the luminance in black display (during application of V0) as 0 and the luminance in white display (during application of V255) as 1 when the grayscale display is set as $\gamma^{2.2}$. The grayscale voltage giving this luminance is denoted by V32.

When no OS driving is adopted, the response speed of the alignment-divided vertical alignment LCD is low. Therefore, as diagrammatically shown in FIG. 20A, an edge 92a of the square 92 located downstream the moving direction may not be observed clearly in some cases. When OS driving is adopted, the response speed is improved, and thus as diagrammatically shown in FIG. 20B, the edge 92a is observed clearly. However, a new phenomenon arises in some cases, in which a dark belt 92b is observed at a position of the square a little behind the edge 92a.

The present inventors have examined the cause of the above problem in various ways and found the followings. The above phenomenon is a new problem that has never occurred as long as OS driving is adopted for conventional TN LCDs, and arises because the alignment regulating means (domain regulating means) placed linearly (in a stripe shape) in each pixel are used to perform alignment division in alignment-divided vertical alignment LCDs.

The above phenomenon will be described in detail with reference to FIGS. 7 and 8.

A change in luminance distribution in a pixel of the LCD 100 observed during OS driving was measured with a high-speed camera. FIG. 7 is a view showing the results of this measurement. Note that the measurement results at 5° C. are shown for easy understanding. The x-axis of this graph represents the position in the direction orthogonal to the extension of the ribs 21 and the slits 22, in which the center in the width direction of one of the adjacent slits 22 is determined as the origin. The luminance distribution was measured at 0 msec (V0-applied state; at this time, OSV32 is applied) and at 16 msec, 18 msec and 500 msec from/after the application of OSV32. Note that after the application of OSV32 in one vertical scanning period (one frame=16.7 msec in this example), V32 was applied continuously in the subsequent vertical scanning periods until the lapse of 500 msec from the application of OSV32. The y-axis of this graph represents the relative luminance determined with respect to the luminance of the light-shaded region as 0 and the luminance of a third LC portion R3 to be described later obtained after 500 msec as 0.1.

Specific cell parameters of the LCD 100 used in the illustrated example are as follows. The thickness d of the liquid crystal layer is 3.9 µm, the inter-rib pitch P is 53 µm, the width W1 of the ribs 21 is 16 µm (including the width of the side faces 4 µm×2), the width W2 of the slits 22 is 10 µm, and the width W3 of the liquid crystal regions 13A is 13.5 µm. The black voltage (V0) is 1.2 V, the white voltage (V255) is 7.1 V, and the voltage (V32) and the OS voltage (OSV32) for grayscale level 32 (transmittance 1.04%) are 2.44 V and 2.67V, respectively, when the γ value is 2.2. The OS voltage (OSV32) was set so that the entire pixel could give the luminance (transmittance) of grayscale level 32 in 16 msec after the black state (V0-applied state).

Figure 7:
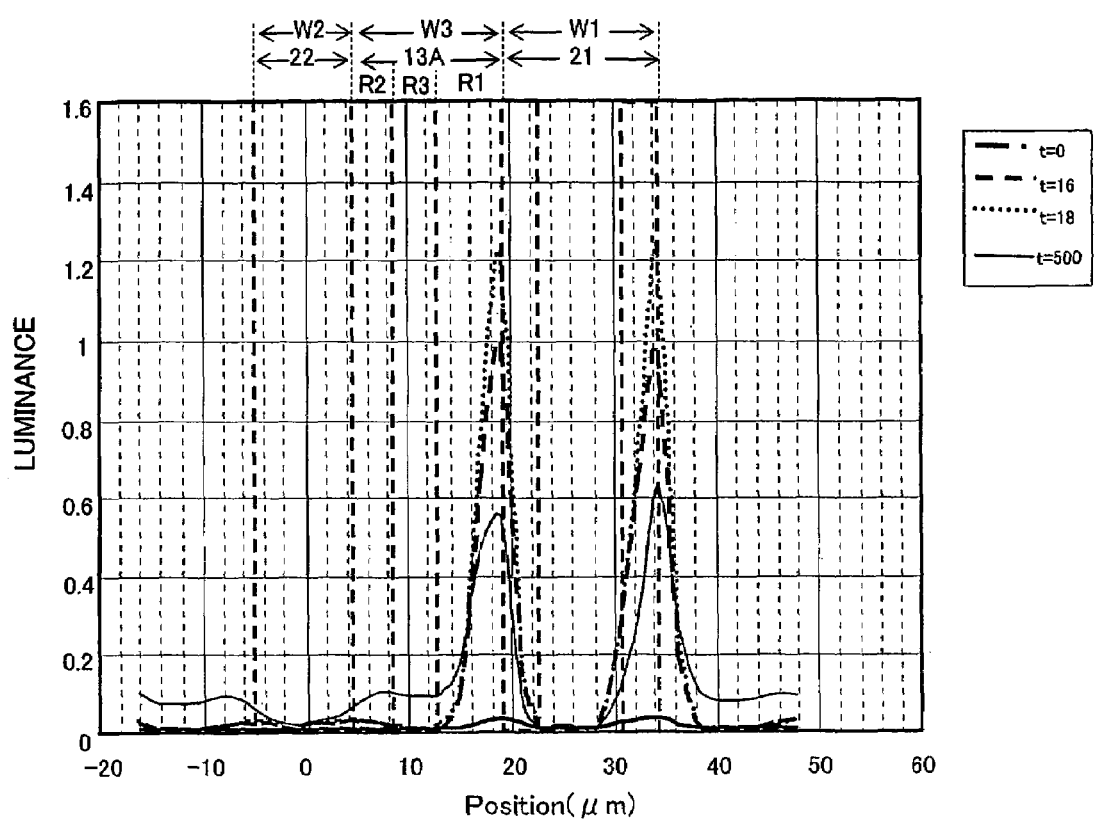
FIG. 7 is a view showing the results of measurement of changes in luminance distribution in a pixel of the LCD 100 with a high-speed camera observed when OS driving is done.

As is found from FIG. 7, in each liquid crystal region 13A, the luminance is high in a portion near the side face 21a of the rib 21 (this portion is called a "first LC portion R1"), and in this portion, the luminance decreases after reaching its maximum at 18 msec. On the contrary, in the remaining portions other than the first LC portion R1, the luminance monotonously increases with time, and the once-increased luminance will typically never be decreased. In each liquid crystal region 13A, also, a portion near the slit 22 (this portion is called a "second LC portion R2") is higher in response speed than the portion in the center between the rib 21 and the slit 22 (this portion is called a "third LC portion R3") because the former portion is influenced by a tilt electric field generated near the slit 22. Thus, each stripe-shaped liquid crystal region 13A defined by the stripe-shaped rib 21 and slit 22 has three LC portions (R1, R2 and R3) different in response speed from one another.

Figure 8B:
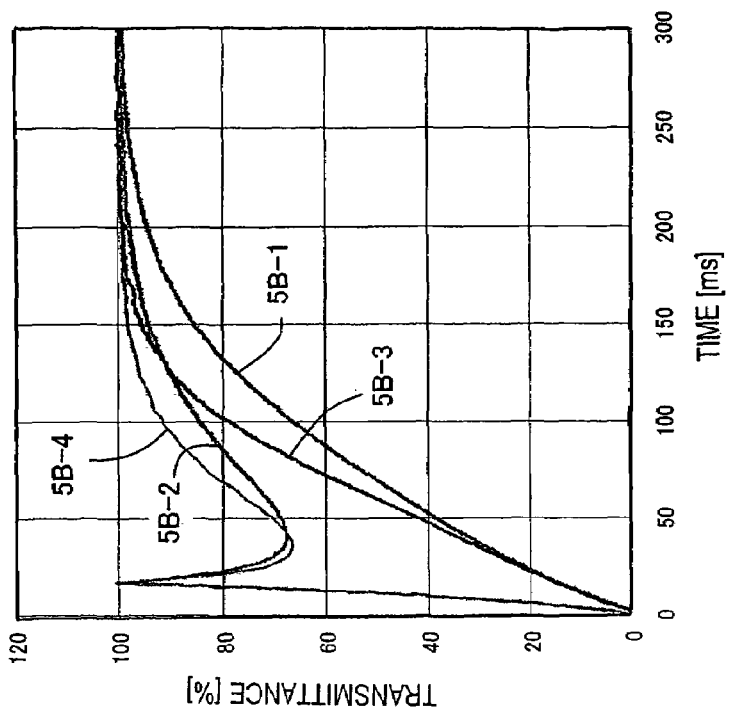
FIGS. 8A and 8B are graphs showing changes in transmittance with time observed when a MVA LCD is subjected to OS driving, measured at temperatures of 25° C. and 5° C., respectively.
Figure 8A:
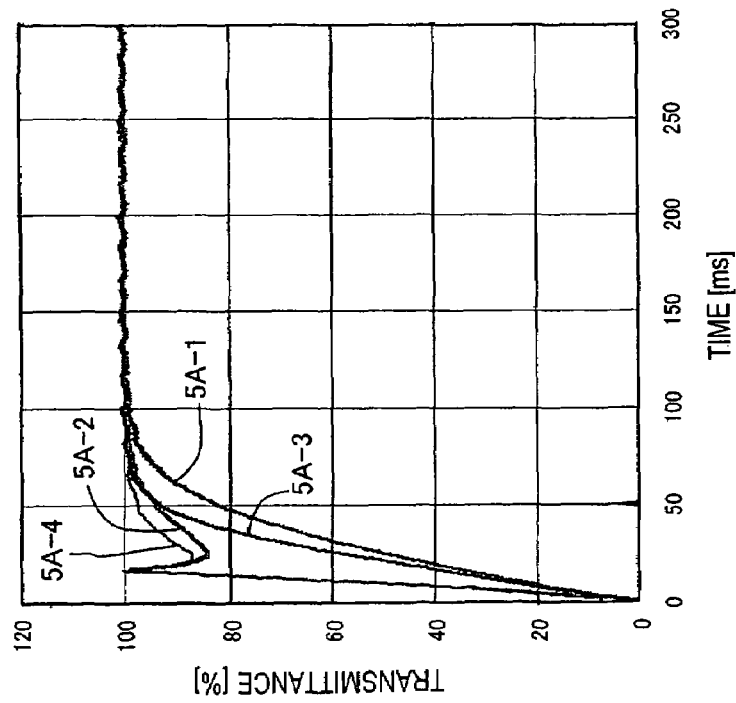

Change in the entire transmittance of the pixel portion 100a with time is then described with reference to FIGS. 8A and 8B. FIGS. 8A and 8B show the results measured at 25° C. and 5° C., respectively, in which the y-axis represents the transmittance determined with respect to the transmittance of grayscale level 0 as 0% and the transmittance of grayscale level 32 as 100%.

In FIG. 8A, curves 5A-1 and 5A-2 represent the results obtained without OS driving and with OS driving, respectively, when the thickness d of the liquid crystal layer is 3.9 µm. Curves 5A-3 and 5A-4 represent the results obtained without OS driving and with OS driving, respectively, when the cell gap is 2.8 µm. Likewise, in FIG. 5B, curves 5B-1 and 5B-2 represent the results obtained without OS driving and with OS driving, respectively, when the thickness d of the liquid crystal layer is 3.9 µm. Curves 5B-3 and 5B-4 represent the results obtained without OS driving and with OS driving, respectively, when the cell gap is 2.8 µm. In any of the above cases, as the liquid crystal material for the liquid crystal layer, selected was a liquid crystal material having a rotational viscosity γ1 of about 140 mPa·s and a flow viscosity ν of about 20 mm²/s and giving a retardation (thickness d×birefringence Δn) of the liquid crystal layer of about 300 nm.

As is apparent from FIGS. 8A and 8B, at both temperatures of 25° C. and 5° C., the following phenomenon is observed when OS driving is done. That is, the transmittance once decreases after reaching a predetermined value (100%) within a vertical scanning period during which an OS voltage has been applied, and then gradually increases to finally reach the predetermined value again. This phenomenon having a minimum in the change of transmittance with time is called "horn response" in some cases.

From comparison between FIGS. 8A and 8B, it is found that the above phenomenon is more eminent at 5° C. (FIG. 8B) at which the response speed of liquid crystal molecules is low. That is, the minimum (or the bottom value) in the change of transmittance with time is smaller (i.e., the bottom of the "horn" or trough is at a lower transmittance value) and the time required to reach the predetermined transmittance value is longer. It is also found from FIGS. 8A and 8B that as the thickness d of the liquid crystal layer is greater, the response speed is lower, that is, the time period during which the transmittance is low is longer, at both temperatures. These tendencies correspond with the results of the visual observation shown in FIG. 20B.

From the above, it has been recognized that the dark belt 92b shown in FIG. 20B is observed because a minimum exists in the change of transmittance with time, and that the reason for the existence of a minimum in the change of transmittance with time is that the response speed greatly differs among the first, second and third LC portions R1, R2 and R3 described above with reference to FIG. 7. In other words, the lower the bottom of the "horn" and the longer it takes to reach the predetermined transmittance the second time from the bottom of the horn, the more visible and prominent the belt 92b in FIG. 20B using OS driving. This phenomenon will be described in more detail with reference to FIG. 7 again.

Liquid crystal molecules in the first LC portion R1 located near the rib 21 are already in a tilted state under the influence of the side face 21a of the rib 21 when a voltage is applied, and thus the response speed of this portion is high. Once an OS voltage (OSV32), set to ensure the shift of the transmittance of the entire pixel from grayscale level 0 to 32 within one frame period, is applied, the transmittance of the first LC portion R1 exceeds at least a transmittance value that is obtained when V32 is normally applied (transmittance value represented by the curve of t=500 msec in FIG. 7), and may even reach or be close to a transmittance value corresponding to the OS voltage (OSV32) in some cases. On the contrary, in the other portions (the second and third LC portions R2 and R3), the response speed is low, failing to reach the transmittance value corresponding to V32 within one frame period even when OSV32 is applied.

In the subsequent frame periods (t>16.7 msec) in which V32 is applied, the transmittance of the first LC portion R1 monotonously decreases to the transmittance value corresponding to V32. On the contrary, the transmittances of the second and third LC portions R2 and R3 monotonously increase to the transmittance value corresponding to V32.

Even when the transmittance of the entire pixel reaches the transmittance value corresponding to V32 within the frame period during which OSV32 is applied, this transmittance includes a component having an excessively high response speed (transmittance component exceeding the transmittance value corresponding to V32). Therefore, when the application of OSV32 is stopped and a predetermined grayscale voltage V32 is applied, the transmittance of the entire pixel temporarily decreases (e.g., see the horn or trough in FIGS. 8A–8B) because the component having an excessively high response speed decreases to the predetermined transmittance at a rate higher than the rate at which components having a low response speed (transmittance components of the second and third LC portions R2 and R3) increase. Thereafter, with increase of the components having a low response speed, the transmittance of the entire pixel increases. This explains the details of the change of transmittance with time in the pixel portion shown in FIGS. 8A and 8B.

The OS driving is also applied to TN LCDs, but the horn response described above is not observed in TN LCDs. The reason is that, in TN LCDs, the alignment division is performed by regulating the alignment directions of liquid crystal molecules in respective liquid crystal regions (domains) with alignment films rubbed in different directions. Since the alignment regulating force is given to the entirety of each liquid crystal region from a planar (two-dimensional) alignment film, no response speed distribution arises in each liquid crystal region. On the contrary, in certain example alignment-divided vertical alignment LCDs, the alignment division is performed with the linearly (one-dimensionally) provided alignment regulating means. Therefore, portions having different response speeds are formed depending on, not only the difference in the alignment regulating force of the alignment regulating means, but also the distance from the alignment regulating means.

To find a configuration that can suppress the horn response characteristic (i.e., to reduce the depth and/or width of the horn or trough when using OS), that is, the occurrence of the phenomenon that the transmittance has a minimum after application of an OS voltage described above, various MVA LCDs having the basic configuration shown in FIGS. 2 and 3 were fabricated by varying the cell parameters (the thickness d of the liquid crystal layer, the rib pitch P, the rib width W1, the slit width W2, the width W3 of the liquid crystal region, the rib height and the like), and the response characteristics of these LCDs were evaluated.

Figure 9:
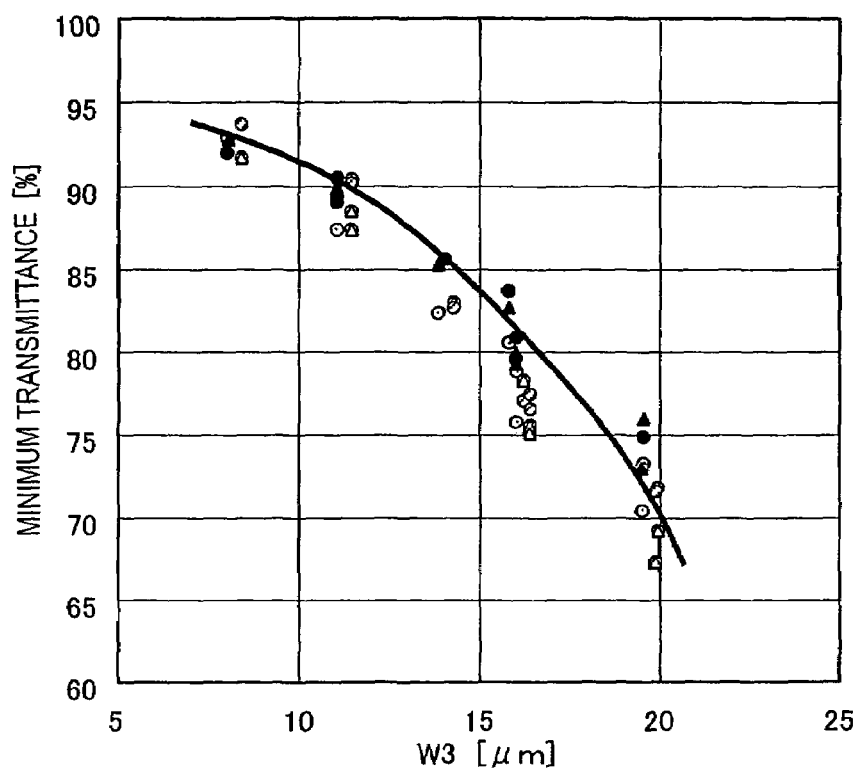
FIG. 9 is a graph showing the minimum (or bottom) of the transmittance taken after application of an OS voltage, obtained as a result of measurement of changes in transmittance with time shown in FIGS. 8A and 8B, for various LCDs with different LC region widths W3.

As a result, the followings were found. It was confirmed that the response speed increased by reducing the thickness d of the liquid crystal layer as described above with reference to FIGS. 8A and 8B. It was recognized that the response speed tended to somewhat increase with increase of the rib width W1 and the slit width W2. The response speed also somewhat increased with increase of the height of the ribs, but increasing the rib height is not desired because the contrast ratio decreases as described above. The effects of improving the response speed by adjusting the rib width W1, the slit width W2 and the rib height were relatively small. Contrarily, large improvement in response characteristic was attained by increasing the length of the ribs. The increase of the length of the ribs placed in each pixel means increase of the density of the ribs in each pixel, and thus the effect of improving the response speed is great. Since the ribs extend in fixed directions (two directions roughly 45° from the transmission axes of the polarizing plates in this embodiment), increase of the length of the ribs results in reducing the width W3 of the liquid crystal region (LC region width W3). From examinations in various ways, it has been found that the LC region width W3 has a great effect on the response characteristic, that is, reduction of the LC region width W3 greatly improves the response characteristic. FIG. 9 shows part of the above results.

FIG. 9 is a view showing the minimum of the transmittance after application of an OS voltage (i.e., the bottom of the horn or trough), observed in the measurement of the change of transmittance with time shown in FIG. 8A, obtained by varying the LC region width W3 for six types of LCDs having cell configurations different in the thickness d of the liquid crystal layer and rib height. Note that the transmittance values are shown with respect to the transmittance of grayscale level 32 as 100%. The minimum of the transmittance (also called "minimum transmittance", "bottom transmittance" or the bottom of the horn/trough in some cases) was roughly uniform irrespective of the thickness d of the liquid crystal layer. The rib width W1 and the slit width W2 of the LCDs used in this measurement were in the range between about 5 μm and about 20 μm, and the rib pitch P was in the range between about 25 μm and about 58 μm. The measurement results shown in FIG. 9 were obtained at 25° C.

From FIG. 9, the followings are found. First, irrespective of the six types (more types if differences in rib width W1 and slit width W2 are counted) of cell configurations, a strong correlation exists between the LC region width W3 and the minimum transmittance (i.e., bottom transmittance or depth of the bottom of the horn/trough). Secondly, the minimum transmittance increases roughly continuously or monotonously, that is, the response characteristic is improved, by reducing the LC region width W3.

From the results of FIG. 9, it is recognized that the minimum transmittance can be as high as 85% or more by reducing the LC region width W3 to about 14 μm or less, and even 90% or more by reducing the width W3 to about 12 μm or less. The dark belt 92b shown in FIG. 20B becomes less observable when the minimum transmittance is 85% or more, and naturally, it becomes further less observable when the minimum transmittance is 90% or more.

Figure 10A:
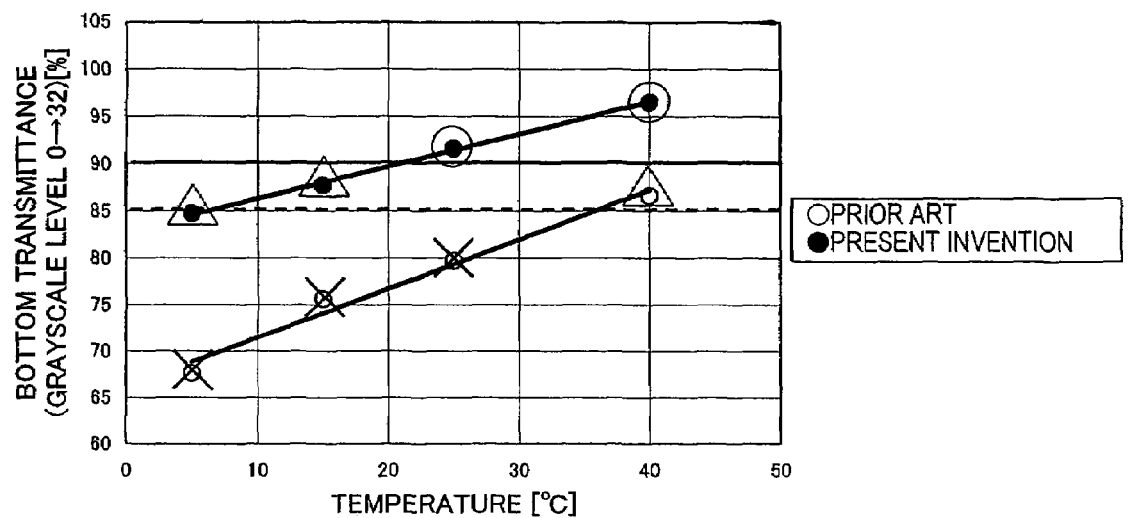
FIGS. 10A and 10B are graphs showing the results of subjective evaluation of problems caused by horn response.
Figure 10B:
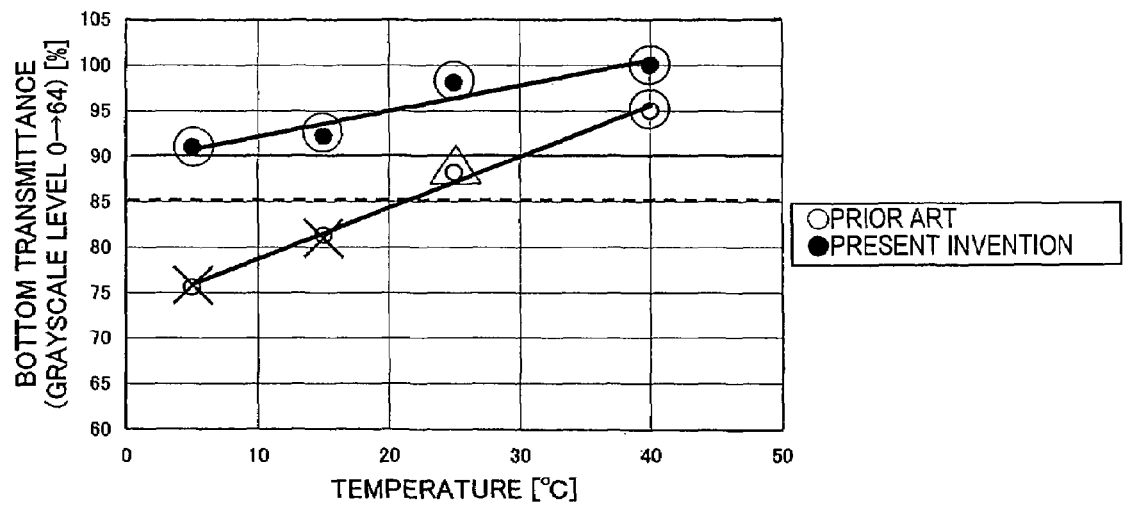

Prototypes of 13-inch VGA LCDs were actually fabricated, and subjective evaluation by 25 persons was conducted on the effect of improvement of the response characteristic. The results are shown in FIGS. 10A and 10B. The 13-inch VGA LCDs (LCD of the invention and conventional LCD) used in this evaluation are the same as LCDs that give the results shown in FIGS. 17A to 17C to be described later. The OS driving conditions are also the same as those to be described later. Hereinafter, the effect obtained by having a minimum transmittance of 85% or more, or 90% or more, will be described.

In the graphs shown in FIGS. 10A and 10B, the x-axis represents the temperature of the display plane of the LCD (this temperature is referred to as the "operating temperature"), and the y-axis represents the minimum transmittance given when OS driving is done. With change of the operating temperature of the LCD, the properties of the liquid crystal material such as the viscosity change, and this leads to change of the response characteristic of the LCD. The response characteristic degrades with fall of the operating temperature, and improves with rise of the operating temperature. In this measurement, the operating temperature was set at 5° C., 15° C., 25° C. and 40° C. The OS driving-caused horn response more easily occurs as the shift in display grayscale level is smaller. FIG. 10A shows the results observed when the display grayscale level is shifted from 0 to 32 (when a square of grayscale level 0 is moved in a background of grayscale level 32), and FIG. 10B shows the results observed when the display grayscale level is shifted from 0 to 64 (when a square of grayscale level 0 is moved in a background of grayscale level 64). The symbols (○, Δ, X) superposed on the points in FIGS. 10A and 10B show the results of the subjective evaluation. While a dark belt like the dark belt 92b shown in FIG. 20B is observed under the influence of horn response, the symbol ○ indicates that almost all the observers hardly visually recognized such a dark belt, the symbol Δ indicates that some observers visually recognized the dark belt but were little annoyed with this, and the symbol X indicates that almost all the observers visually recognized the dark belt.

As is found from FIGS. 10A and 10B, the results of the subjective evaluation are Δ or ○ when the minimum transmittance is 85% or more, and they are ○ when the minimum transmittance is 90% or more. In the conventional LCD, in the case of the shift of the grayscale level from 0 to 32 (FIG. 10A), it is only when the operating temperature is 40° C. that the minimum transmittance reaches 85% or more. The minimum transmittance is only around 80% with the subjective evaluation of X at 25° C. that is a temperature generally used (room temperature). On the other hand, in the LCD of the invention, in the case of the shift of the grayscale level from 0 to 32 (FIG. 10A), the minimum transmittance is 85% or more even at the operating temperature of 5° C., and it is 90% or more at an operating temperature of 25° C. or more. In the case of the shift of the grayscale level from 0 to 64 (FIG. 10B), a minimum transmittance of 0.90% or more can be obtained even at the operating temperature of 5° C. In other words, the bottom of the horn or trough is significantly deeper in the prior art than in embodiments of the instant invention.

As described above, with the minimum transmittance of 85% or more obtained by setting the LC region width W3 at about 14 μm or less, or with the minimum transmittance of 90% or more obtained by setting the LC region width W3 at about 12 μm or less, the resultant MVA LCD is excellent in moving image display characteristics in which a dark belt is less or hardly recognizable even when OS driving is adopted.

In the currently available 12 models of MVA LCDs (including the PVA LCD shown in FIG. 1C) (three manufactures, panel size: 15 to 37 inches), the LC region width W3 is in the range between about 15 μm and about 27 μm (the rib width W1 is in the range between about 7 μm and about 15 μm, and the width W2 of the second alignment regulating means is in the range between about 7 μm and about 10 μm). According to the results described above (in FIG. 9, for example), a dark belt will be observed in these LCDs if OS driving is done as in this embodiment.

The reason why the response characteristic is improved by reducing the LC region width W3 will be described with reference to FIGS. 11 and 7.

Figure 11:
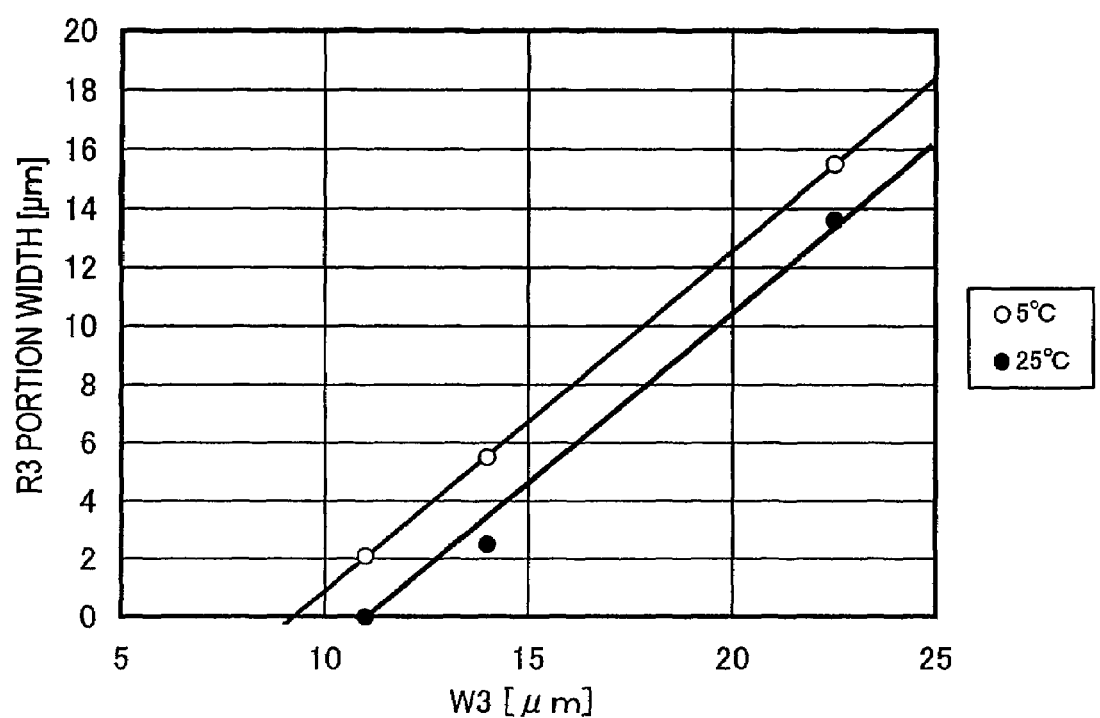
FIG. 11 is a graph showing the relationship between the LC region width W3 and the width of a third LC portion R3.

FIG. 11 is a graph showing the relationship between the LC region width W3 and the width of the third LC portion R3. As described above with reference to FIG. 7, the third LC portion R3 is a portion of the liquid crystal region 13A located apart from both the rib 21 and the slit 22 and thus lowest in response speed.

Herein, the third LC portion R3 is defined as follows to enable quantitative expression of the width of the portion R3. That is, the third LC portion R3 is a portion of the liquid crystal region in which the transmittance attained in one frame after application of an OS voltage (OSV32) with which the state of display of grayscale level 0 (black display state) is shifted to grayscale level 32 is twice or less the transmittance in the black display state. A change in transmittance distribution with time was measured as in FIG. 7 for LCDs different in LC region width W3, and the width of the third LC portion R3 determined according to the above definition was obtained for each LCD. The results were blotted as the graph of FIG. 11. FIG. 11 shows the measurement results at 25° C. and 5° C.

The graph of FIG. 11 includes two straight lines having the same inclination, indicating that the widths of the first LC portion R1 and the second LC portion R2 are constant irrespective of the LC region width W3. Thus, the relationship that R3 width=LC region width W3–R1 width–R2 width is established. The third LC portion R3 will no more substantially exist with improvement of the response characteristic of the liquid crystal region 13A. Even in this event, however, it is possible to determine the width of the third LC portion R3 as a negative value from the graph (straight line) of FIG. 11. This width of the third LC portion R3 can therefore be used as a parameter representing the response characteristic of the liquid crystal region 13A.

As is found from FIG. 11, at 25° C., the width of the third LC portion R3 is zero when the LC region width W3 is about 12 μm or less. That is, the third LC portion R3 low in response speed as described above substantially disappears. This corresponds to the LC region width W3 giving a minimum transmittance of 90% or more in FIG. 9, exhibiting good correlation therebetween.

In the results obtained at 5° C. shown in FIG. 11, the width of the third LC portion R3 is zero when the LC region width W3 is about 8 μm or less. It is therefore found that the LC region width W3 is preferably about 8 μm or less to ensure more excellent response characteristic (moving image display characteristics).

Figure 12:
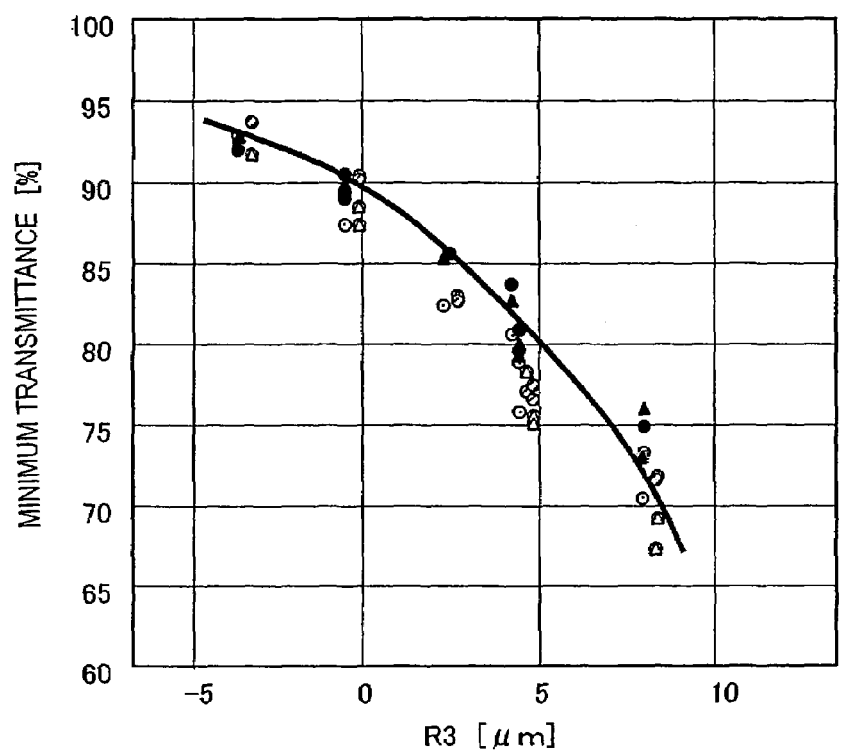
FIG. 12 is a graph re-plotting the values in the graph of FIG. 9 with respect to the width of the third LC portion R3.

FIG. 12 is a graph re-plotted from the graph of FIG. 9 with respect to the width of the third LC portion R3. As is found from FIG. 12, the minimum transmittance can be 85% or more by reducing the width of the third LC portion R3 to about 2 μm or less, or it can be 90% or more by reducing the width of R3 to about 0 μm or less.

As described above, by reducing the LC region width W3, the response characteristic can be improved, and thus the minimum transmittance in horn response (see FIGS. 8A and 8B) occurring when OS driving is done can be increased to 85% or more of a predetermined transmittance. With this improvement, the phenomenon caused by the horn response is hardly observed, and thus an LCD permitting good moving image display is provided.

It is difficult to fabricate an LCD having an LC region width W3 below 2 μm. Therefore, the LC region width W3 is preferably 2 μm or more, and also, for the same reason, the rib width W1 and the slit width W2 are preferably 4 μm or more.

The OS driving method adopted for the LCD of the present invention is not specifically limited, but any known OS driving method may be adopted as appropriate. OS voltages may be set as follows, for example. The OS voltage is set so that a predetermined transmittance is attained within one vertical scanning period for each shift of the display grayscale level every 32 levels (for example, from V0 to V32) as described above. As for a shift of the grayscale level by less than 32 levels, the OS voltage to be applied may be determined by interpolation using OS voltage values determined for the shift every 32 grayscale levels. The OS voltage may be changed according to the grayscale levels before and after the shift. Otherwise, as described in Literature 2, no OS voltage may be applied for a shift between some grayscale levels.

In this embodiment, the OS voltage value with which a predetermined transmittance was attained after one frame period was determined every 32 grayscale levels and interpolation was made between the determined OS voltage values, to obtain an OS voltage value corresponding to each shift of grayscale levels. Using the thus-obtained OS voltages, the MVA LCD of this embodiment having an LC region width W3 of 14 μm or less was driven. As a result, good moving image display was attained.

Next, the aperture ratio and transmittance of the MVA LCD of this embodiment will be described. As is found from FIGS. 2 and 3, reducing the LC region width W3 means lowering the aperture ratio ((pixel area−rib area−slit area)/pixel area) and thus lowering the display luminance. Therefore, if the spacing between the alignment regulating means (that is, the LC region width W3) is uniformly reduced to improve the response characteristic, the aperture ratio will decrease. To avoid this problem, Literature 1 (see FIG. 107, for example), for example, describes that while the spacing between the adjacent alignment regulating means is narrowed in a certain portion of one pixel, it is made wide in the remaining portion of the pixel, to thereby achieve improvement of the response characteristic without lowering the aperture ratio. However, for the reason described above, having both portions narrow and wide in the spacing between the alignment regulating means, as described in Literature 1, will result in formation of portions largely different in response speed (in particular, result in increase of the area of the portion low in response speed). This will make the problem of horn response significant.

According to the basic configuration of the LCD of the embodiment of the present invention shown in FIGS. 2 and 3, the spacing between the first and second alignment regulating means 21 and 22 (that is, the width W3 of the stripe-shaped liquid crystal region 13A) is set to fall within the range described above. Thus, occurrence of the problem of horn response can be suppressed. Also, although the liquid crystal regions 13A are uniform in width in one pixel in the illustrated example, there may be a case that liquid crystal regions 13A different in width W3 are formed in one pixel due to a trouble related to the fabrication process (for example, an alignment error in the process of bonding of the substrates). In such a case, however, as long as the widths W3 of respective liquid crystal regions 13A satisfy the above condition, occurrence of the problem of horn response can be suppressed.

Moreover, it was clarified from the examinations conducted in relation to the present invention that the MVA LCD of this embodiment could keep its display luminance from lowering despite the reduction of the LC region width W3 from the width conventionally used. This is due to an unexpected effect that the transmittance per unit area of a pixel (hereinafter, called the "transmission efficiency") improves by reducing the LC region width W3 from the conventional width. The transmission efficiency is determined by actually measuring the transmittance of a pixel and dividing the measured value by the aperture ratio. Herein, the transmission efficiency is expressed by a value somewhere between 0 and 1.

Figure 13A:
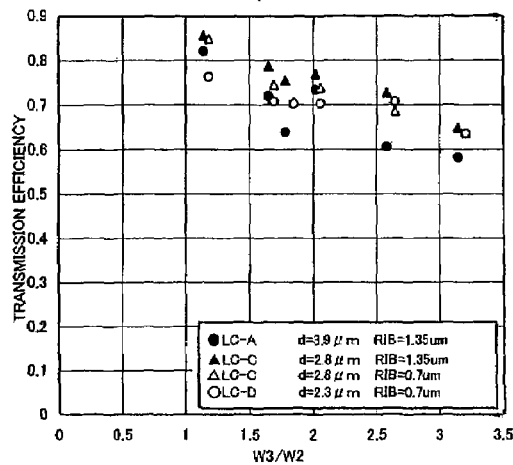
FIGS. 13A and 13B are graphs showing the results of the transmission efficiency determined for the LCDs having various cell parameters of the embodiment.
Figure 13B:
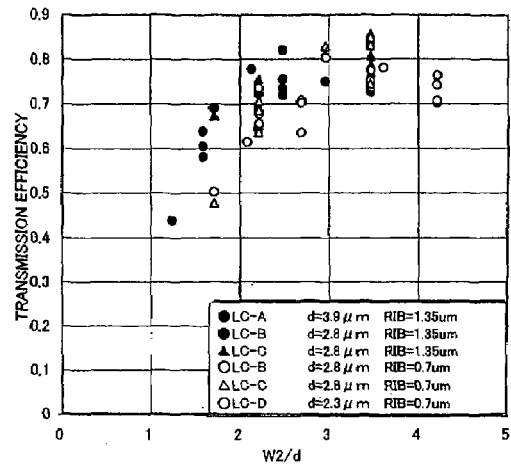
Figure 13C:
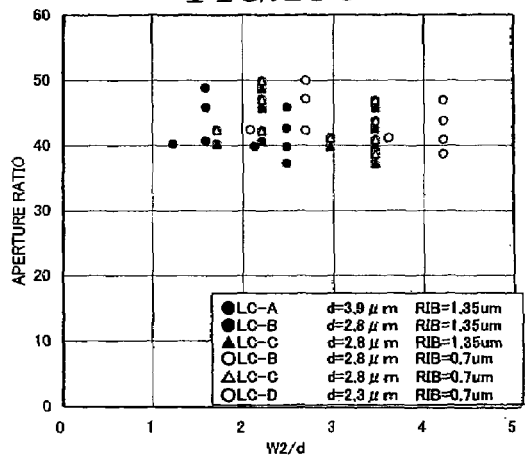
FIG. 13C is a graph showing aperture ratios of these LCDS.

The results of the transmission efficiency obtained for the LCDs of the embodiment having various cell parameters described above with reference to FIG. 9 are shown in FIGS. 13A and 13B. FIGS. 13A and 13B are graphs of which the x-axes represent (LC region width W3/slit width W2) and (slit width. W2/thickness d of the liquid crystal layer), respectively. FIG. 13C shows the aperture ratios of the respective LCDs.

As is found from FIG. 13A, the transmission efficiency rather improves from that conventionally obtained (about 0.7) when (LC region width W3/slit width W2) is 1.5 or less. Also, as is found from FIG. 13B, the transmission efficiency stabilizes at values as high as about 0.7 or more when (slit width W2/thickness d of the liquid crystal layer) is about 3 or more.

Figure 14:
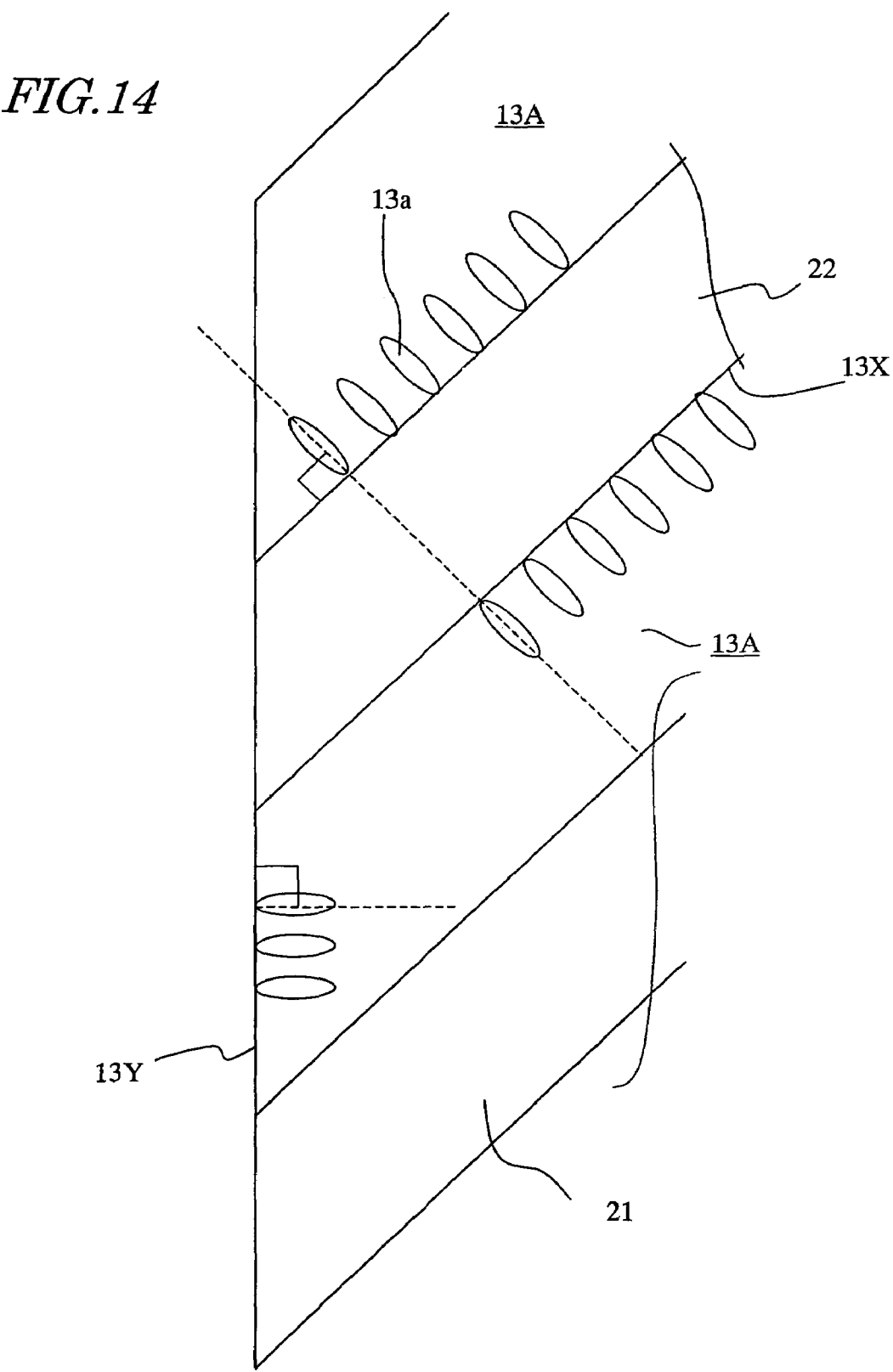
FIG. 14 is a view diagrammatically showing the alignment of liquid crystal molecules 13a in a portion of a liquid crystal region 13A near a slit 22.

The reason why the transmission efficiency improves by reducing the LC region width W3 as shown in FIG. 13A will be described with reference to FIG. 14. FIG. 14 diagrammatically shows how liquid crystal molecules 13a located near the slit 22 in the liquid crystal region 13A are aligned. Among the liquid crystal molecules 13a in the liquid crystal region 13A, those located near a side (major side) 13X of the stripe-shaped liquid crystal region 13A tilt in the plane perpendicular to the major side 13X under the influence of a tilt electric field. On the contrary, liquid crystal molecules 13a located near a side (minor side) 13Y of the liquid crystal region 13A intersecting the major side 13X tilt in a direction different from the direction of the tilt of the liquid crystal molecules 13a near the major side 13X, under the tilt electric field. In other words, the liquid crystal molecules 13a located near the minor side 13Y of the liquid crystal region 13A tilt in a direction different from a predetermined alignment direction defined by the alignment regulating force of the slit 22, acting to disturb the alignment of the liquid crystal molecules 13a in the liquid crystal region 13A. By reducing the width W3 of the liquid crystal region 13A (that is, reducing the value of (length of minor side/length of major side)), the proportion of the liquid crystal molecules 13a tilting in the predetermined direction under the influence of the alignment regulating force of the slit 22 increases in all the liquid crystal molecules 13a in the liquid crystal region 13A, resulting in increase of the transmission efficiency. In this way, by reducing the LC region width W3, obtained is the effect of stabilizing the alignment of the liquid crystal molecules 13a in the liquid crystal region 13A, and as a result, the transmission efficiency improves.

From examinations in various ways, it has been found that the effect of stabilizing the alignment (effect of improving the transmission efficiency) obtained by reducing the LC region width W3 is exhibited significantly when the thickness d of the liquid crystal layer is small, for example, as small as less than 3 μm. The reason is considered to be as follows. As the thickness d of the liquid crystal layer is smaller, the action of the tilt electric field from the slit 22 is more intense. However, at the same time, the liquid crystal layer is more influenced by the electric field from gate bus lines and source bus lines placed in the vicinity of the pixel electrode 12, or the electric field from adjacent pixel electrodes. These electric fields act to disturb the alignment of the liquid crystal molecules 13a in the liquid crystal layer 13A. Therefore, it can be said that the alignment stabilizing effect described above is exhibited significantly in the case that the thickness d of the liquid crystal layer is small in which the alignment of the liquid crystal molecules 13a tend to be disturbed.

The LCD exemplified in this embodiment includes the comparatively thick interlayer insulating film 52 covering the gate bus lines and the source bus lines, and the pixel electrode 12 is formed on the interlayer insulating film 52, as shown in FIG. 2. The influence of the interlayer insulating film 52 on the alignment of the liquid crystal molecules 13a will be described with reference to FIGS. 15A and 15B.

Figure 15A:
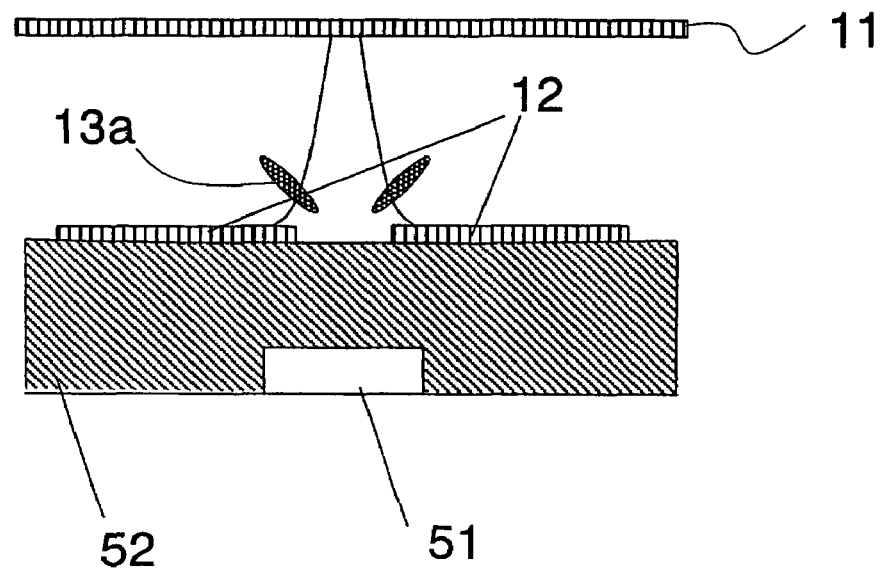
FIGS. 15A and 15B are diagrammatic views for demonstrating the influence of an interlayer insulating film of an LCD on the alignment of liquid crystal molecules.

As shown in FIG. 15A, the interlayer insulating film 52 of the LCD of this embodiment is comparatively thick (for example, the thickness is in the range between about 1.5 μm and about 3.5 μm). Therefore, even if the pixel electrode 12 and the gate bus line or the source bus line 51 overlap each other via the interlayer insulating film 52 therebetween, a capacitance formed therebetween is too small to give an undesirable significant influence on the display quality. Also, the alignment of the liquid crystal molecules 13a existing above the spacing between the adjacent pixel electrodes 12 is mostly influenced by the tilt electric field generated between the counter electrode 11 and the pixel electrodes 12, as diagrammatically shown by the electric lines of force in FIG. 15A, and hardly influenced by the source bus line 51.

Figure 15B:
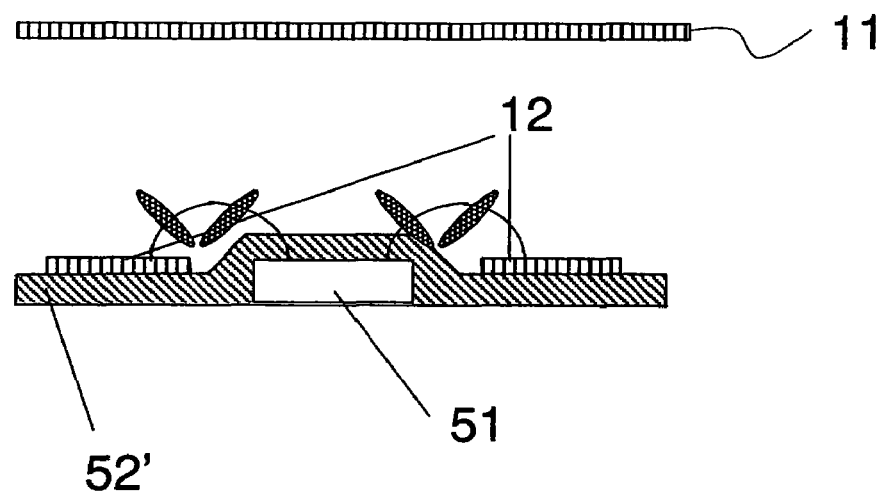

To the contrary, when a comparatively thin interlayer insulating film 52' (for example, an $SiO_2$ film having a thickness of several hundred nanometers) is formed, a comparatively large capacitance may be formed if the source bus line 51, for example, and the pixel electrode 12 overlap each other via the interlayer insulting film 52' therebetween, resulting in degradation of the display quality. To prevent this problem, as shown in FIG. 15B, arrangement is made to avoid overlap between the pixel electrode 12 and the source bus line 51 in certain example instances where the interlayer insulating film is very thin (however, this need not be done when the interlayer insulating film(s) is of sufficient thickness to avoid such a problem). In this arrangement, the liquid crystal molecules 13a existing above the spacing between the adjacent pixel electrodes 12 are largely influenced by the electric field generated between the pixel electrodes 12 and the source bus line 51, as shown by the electric lines of force in FIG. 15B, resulting in disturbance of the alignment of the liquid crystal molecules 13a located at the ends of the pixel electrodes 12.

As is apparent from comparison between FIGS. 15A and 15B, by providing the comparatively thick interlayer insulating film 52 as in the exemplified LCD of this embodiment, the liquid crystal molecules 13a are substantially free from the influence of the electric field from the gate bus lines/source bus lines, and thus can be advantageously aligned favorably in a desired direction with the alignment regulating means. In addition, since the influence of the electric field from the bus lines is minimized with the comparatively thick interlayer insulating film 52, the alignment stabilizing effect obtained by reducing the thickness of the liquid crystal layer can be exhibited significantly.

To intensify the alignment regulating force of the slit 22, an electrode having a different potential from the electrode through which the slit 22 is formed (for example, a storage capacitor electrode when the slit is formed through the pixel electrode) may be placed on the lower face of the slit 22 (face opposite to the liquid crystal layer 13).

From the standpoint of the response characteristic, the thickness d of the liquid crystal layer 13 is preferably small (see FIGS. 8A and 8B, for example). By setting the thickness d of the liquid crystal layer 13 at less than 3 μm in the LCD having the configuration described above, an MVA LCD permitting further high-definition moving image display can be provided.

The reason why the response characteristic is improved by reducing the thickness d of the liquid crystal layer 13 will be described with reference to FIGS. 16A and 16B.

Figure 16A:
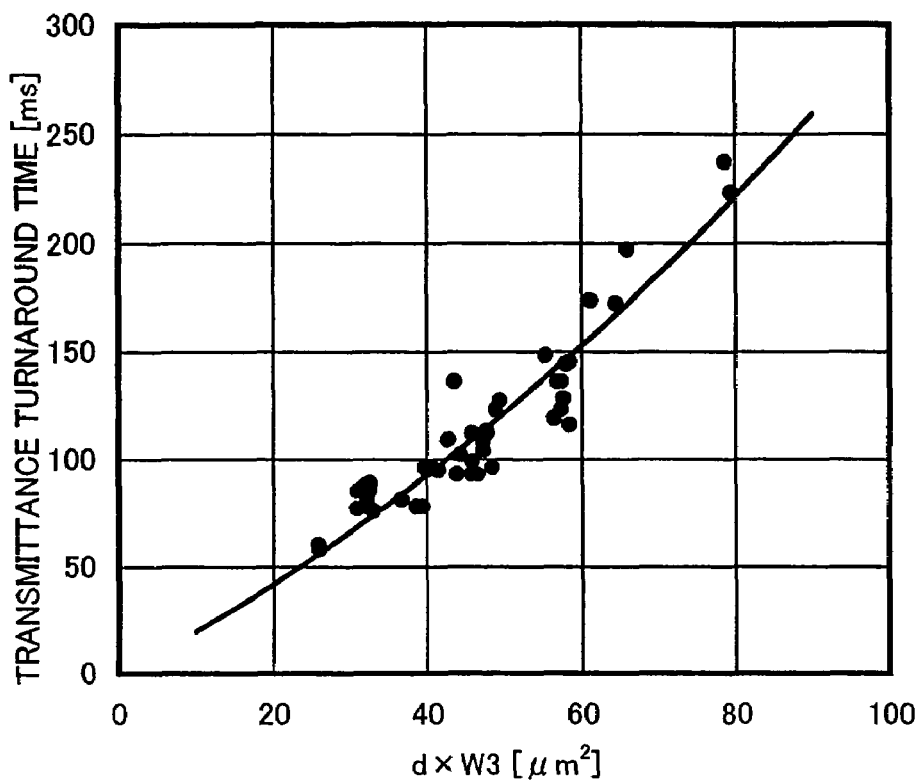
FIG. 16A is a graph showing the relationship between the product of the LC region width W3 and the thickness d of the liquid crystal layer and the transmittance turnaround time.
Figure 16B:
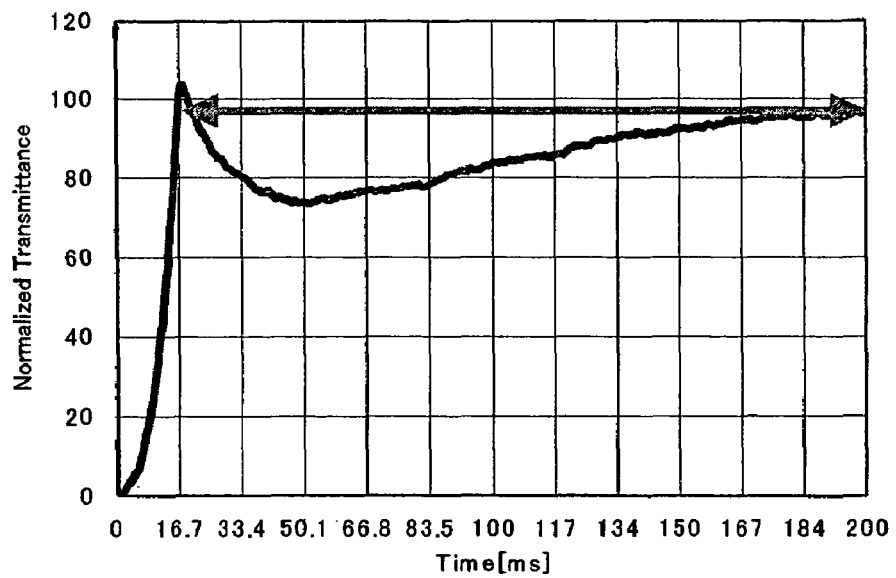
FIG. 16B is a view for definition of the transmittance turnaround time.

In the graph of FIG. 16A, the x-axis represents the product of the width W3 of the liquid crystal region 13A and the thickness d of the liquid crystal layer 13, and the y-axis represents the transmittance turnaround time. The definition of the "transmittance turnaround time" as used herein will be described with reference to FIG. 16B. As described above, in OS driving, the transmittance changes with time as diagrammatically shown in FIG. 16B. Specifically, with application of an OS voltage (at time of 0 ms), the transmittance reaches a predetermined value after one frame (at time of 16.7 ms) and then decreases to a minimum. Thereafter, the transmittance gradually increases to be close to a value corresponding to a predetermined grayscale voltage. In this change of the transmittance, the time length from the time (16.7 ms) of the first reach to the predetermined transmittance to the time of reach to 99% of the predetermined transmittance via the minimum is called the "turnaround time". Note that the results illustrated are those obtained when the display grayscale level is shifted from 0 to 32 as an example reference.

As is found from FIG. 16A, as (d×W3) is smaller, the transmittance turnaround time is shorter, exhibiting a more excellent response characteristic. The LC region width W3 is preferably set at 14 μm or less as described above. In this case, if the thickness d of the liquid crystal layer is set at less than 3 μm, the transmittance turnaround time will be about 100 ms or less.

As described above, by setting the LC region width W3 at 14 μm or less and the thickness d of the liquid crystal layer at less than 3 μm, occurrence of the problem related to the horn response can be suppressed, and further the response characteristic can be improved.

A prototype of 13-inch VGA LCD was actually fabricated as described above, and the moving image display performance thereof was evaluated. The evaluation results are as follows. As the cell parameters, substantially the same values as those exemplified for the LCD 100 shown in FIG. 7 were used, except that the LC region width W3 was set at 10.7 μm in this case. For comparison, the characteristics of a conventional LCD of which the thickness d of the liquid crystal layer was 3.4 μm and the LC region width W3 was 15.4 μm were also evaluated.

Figure 17A:
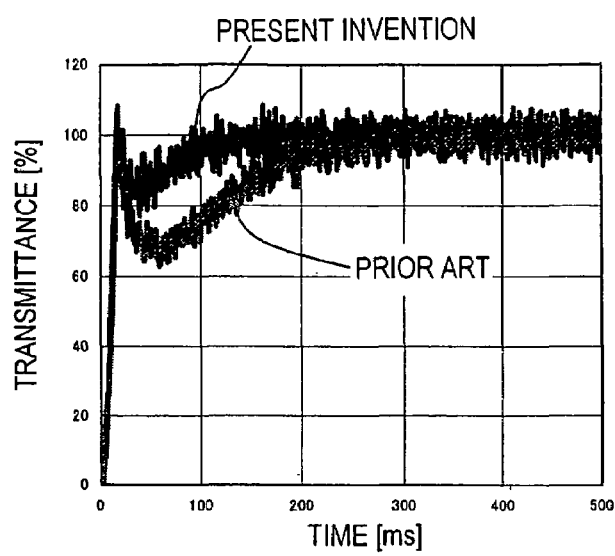
FIGS. 17A to 17C are graphs showing changes in transmittance with time observed when the LCD of an embodiment of the present invention and a conventional LCD are subjected to OS driving.
Figure 17B:
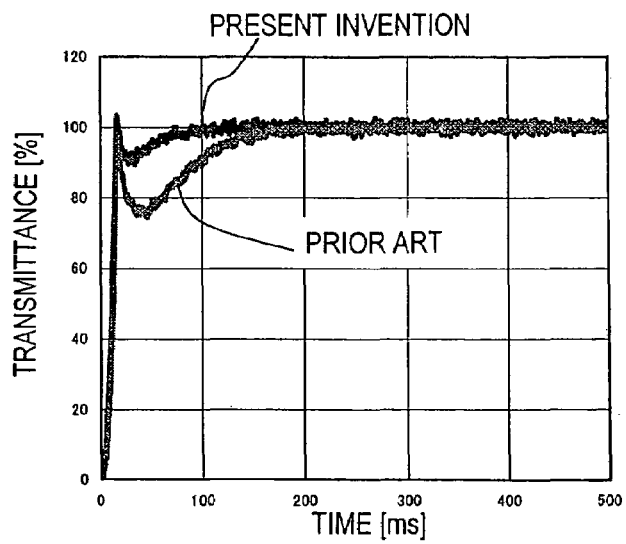
Figure 17C:
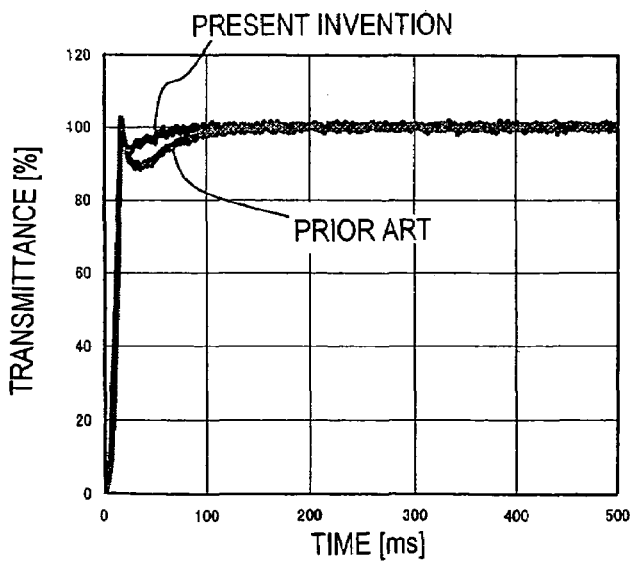

FIGS. 17A to 17C show the results of evaluation of the change with time of the entire transmittance (horn response characteristic) of the pixel portion for the LCD of the invention and the conventional LCD. Specifically, FIGS. 17A to 17C show the horn response characteristic observed when the display grayscale level is shifted from 0 to 32 (FIG. 17A), from 0 to 64 (FIG. 17B) and from 0 to 96 (FIG. 17C). Note that OS driving was done for both the LCD of the invention and the conventional LCD, and that the operating temperature was 5° C.

As is found from FIGS. 17A to 17C, in the LCD of the invention, in which the response characteristic has been improved, the minimum transmittance (i.e., the bottom transmittance) is higher than in the conventional LCD in any of the above cases, achieving 80% or more of the transmittance corresponding to a predetermined grayscale level. In addition, as a result of subjective evaluation performed in the manner described above, while a dark belt was observed when OS driving was done for the conventional LCD, a dark belt was hardly recognized when OS driving was done for the LCD of the example embodiment of the invention.

Hereinafter, the specific conditions of the OS driving and the response characteristic for the LCD of the invention and the conventional LCD will be described with reference to Tables 2 to 7 below. Note that Tables 2 to 7 show the results obtained at 5° C.

In each of Tables 2 to 7, the value at the left end (start) indicates the display grayscale level in the initial state, and the values in the upper row (end) indicate the display grayscale levels after the rewrite. Herein, the case that the display grayscale level in the initial state is 0 will be described.

Figure 18:
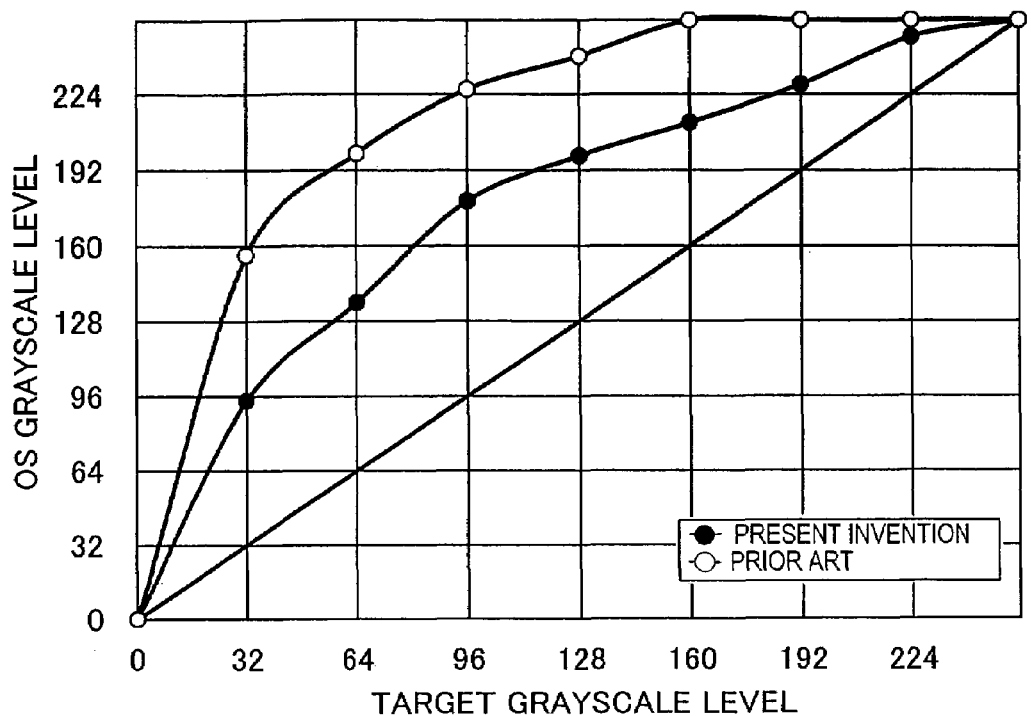
FIG. 18 is a view showing the set values of OS voltages used to obtain the changes in transmittance shown in FIGS. 17A to 17C.

The OS voltage values (herein indicated by the corresponding display grayscale levels) are set as shown in Table 2 for the LCD of an example of the invention and in Table 5 for the conventional LCD. For example, as shown in Table 2, for the shift of display from grayscale level 0 to 32, a voltage value corresponding to grayscale level 94 was applied as the OS voltage. As for grayscale levels that are not shown in Tables 2 and 5, a graph shown in FIG. 18 was prepared based on the relationship set in Tables 2 and 5, to obtain corresponding OS grayscale levels by interpolation.

Tables 3 and 4 show the response times required when no OS driving is done and when OS driving is done, respectively, for the LCD of an example of the invention. Likewise, Tables 6 and 7 show the response times required when no OS driving is done and when OS driving is done, respectively, for the conventional LCD. The response time used in this measurement refers to the time (unit: msec) required for a transmittance to change from 10% to 90% when the change of a predetermined transmittance in each shift in grayscale level is from 0% to 100%.

As shown in Tables 2 and 5, the OS voltage was set every 32 grayscale levels so that a predetermined grayscale level was reached within one frame period. For example, as shown in Table 2 for the LCD of the invention, the OS voltage for the shift of the grayscale level from 0 to 32 (OSV32) was set at V94 (voltage corresponding to grayscale level 94). This indicates that V94 was applied in place of V32 to be applied in the normal driving. For the conventional LCD, as shown in Table 5, the OS voltage for the shift of the grayscale level from 0 to 32 (OSV32) was set at V156 (voltage corresponding to grayscale level 156). The reason why the OS voltage value is higher in the conventional LCD is that the LCD of the example of the invention is more excellent in response characteristic (shorter in response time) as is apparent from comparison between Tables 3 and 6. From these tables, also, it is proved that the configuration described above improves the response characteristic.

As is found from the response time shown in Table 3, in the LCD of the example of the invention, the response time tends to be longer than one frame period (16.7 msec) in display of low grayscale levels when no OS driving is done. With OS driving, however, the response time can be made shorter than one frame period for all the grayscale levels as shown in Table 4. In addition, the problem of horn response does not occur as described above. On the contrary, when OS driving is done for the conventional LCD, the response time is greatly improved as shown in Table 7, but is still longer than one frame period in some cases, and moreover the problem of horn response occurs as described above.

TABLE 2

OS amount

| | | | | | end | | | |
|---|---|---|---|---|---|---|---|---|
| | 0 | 32 | 64 | 96 | 128 | 160 | 192 | 224 | 255 |
| 0 | 0 | 94 | 136 | 179 | 198 | 212 | 228 | 248 | 255 |

TABLE 3

(Without OS, 10–90%)

| | | | | | end | | | |
|---|---|---|---|---|---|---|---|---|
| | 0 | 32 | 64 | 96 | 128 | 160 | 192 | 224 | 255 |
| 0 | | 99.5 | 69.6 | 57.5 | 43.5 | 34.8 | 27.1 | 16.6 | 15.5 |

TABLE 4

(With OS, 10–90%)

| | | | | | end | | | |
|---|---|---|---|---|---|---|---|---|
| | 0 | 32 | 64 | 96 | 128 | 160 | 192 | 224 | 255 |
| 0 | | 11.5 | 10.3 | 10.6 | 10.2 | 10.3 | 10.0 | 8.3 | 15.5 |

TABLE 5

OS amount

| | | | | | end | | | |
|---|---|---|---|---|---|---|---|---|
| | 0 | 32 | 64 | 96 | 128 | 160 | 192 | 224 | 255 |
| 0 | 0 | 156 | 199 | 226 | 240 | 255 | 255 | 255 | 255 |

TABLE 6

(Without OS, 10–90%)

| | | | | | end | | | |
|---|---|---|---|---|---|---|---|---|
| | 0 | 32 | 64 | 96 | 128 | 160 | 192 | 224 | 255 |
| 0 | | 212.7 | 143.6 | 94.9 | 69.3 | 48.7 | 35.4 | 26.1 | 28.1 |

TABLE 7

(With OS, 10–90%)

| | | | | | end | | | |
|---|---|---|---|---|---|---|---|---|
| | 0 | 32 | 64 | 96 | 128 | 160 | 192 | 224 | 255 |
| 0 | | 11.6 | 9.4 | 9.0 | 9.4 | 14.5 | 29.2 | 33.8 | 28.1 |

As described above, the LCD of an example embodiment of the invention exhibits excellent moving image display characteristics by adopting OS driving. Therefore, with further provision of a circuit for receiving television broadcast, the LCD can be suitably used as an LCD TV permitting high-definition moving image display. To attain the OS driving, known methods may be broadly adopted. A drive circuit adapted to apply an OS voltage higher than a grayscale voltage determined in advance to correspond to a predetermined grayscale level (or possibly apply the grayscale voltage) may further be provided. Otherwise, the OS driving may be executed by software.

In the above embodiment, the example of the present invention was described as adopting OS driving. There is also a case that a voltage is applied in a similar way (for example, the display signal voltage is applied in the order of V0→V94→V32) although no OS driving is adopted. In such a case, also, the effect of the present invention can be obtained.

Figure 19:
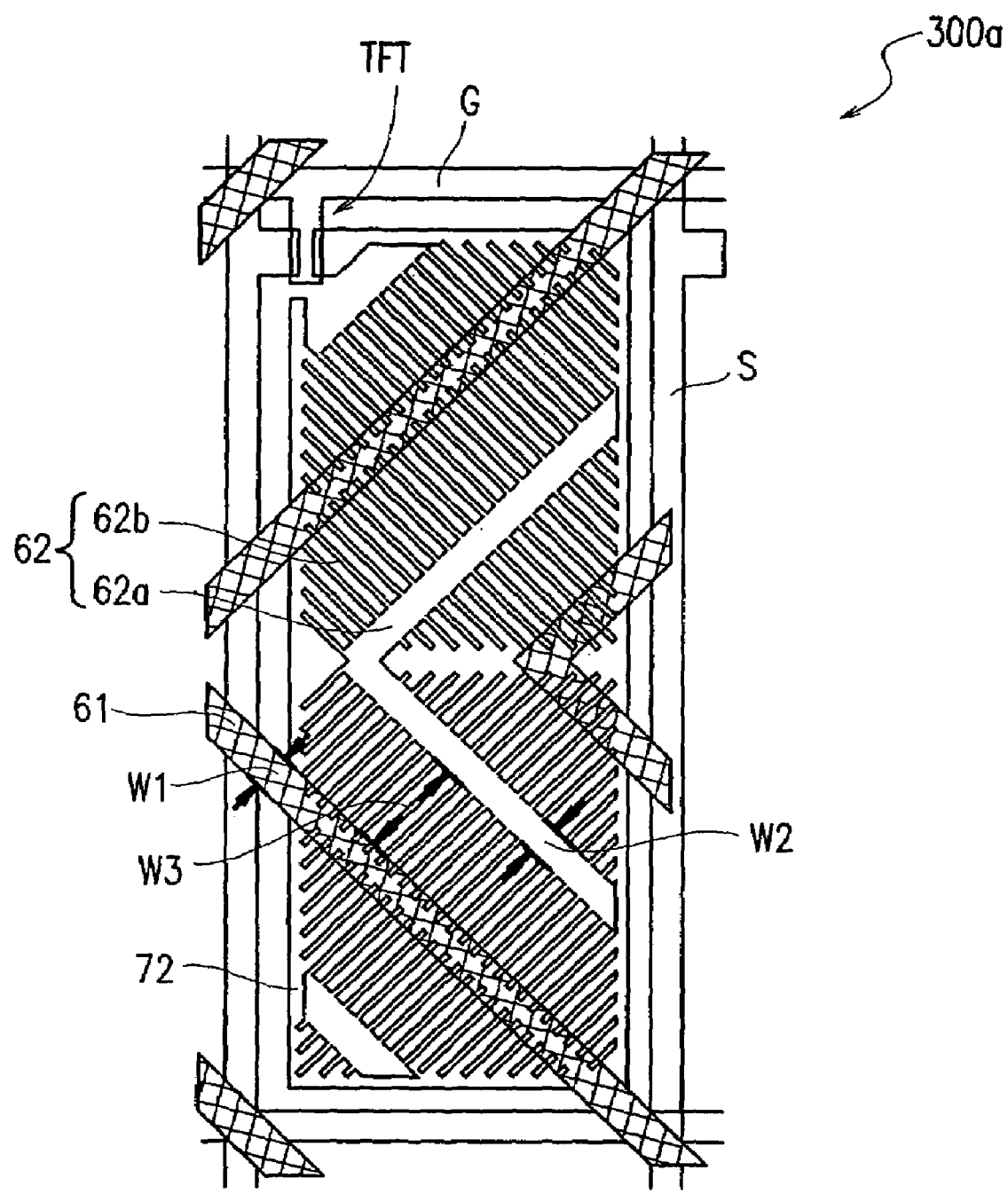
FIG. 19 is a plan view diagrammatically showing a pixel configuration of an LCD of another embodiment of the present invention.

Examples of the present invention are applicable, not only to the MVA LCD described above, but also to an MVA LCD shown in FIG. 19, for example, which has alignment regulating means of a comb shape as viewed from top. In the MVA LCD having a pixel 300a shown in FIG. 19, a vertical alignment liquid crystal layer is alignment-divided with a pixel electrode 72, openings 62 formed through the pixel electrode 72, and ribs (or protrusions) 61 placed on a counter electrode (not shown) facing the pixel electrode 72 via the liquid crystal layer therebetween. The ribs 61 have a stripe shape having a constant width W1 as in the MVA LCD of the embodiment described above. Each opening or slit 62 includes a stripe-shaped trunk 62a and branches 62b extending in the direction orthogonal to the extension of the trunk 62a. The stripe-shaped ribs 61 and the stripe-shaped trunks 62a are placed in parallel with each other, defining liquid crystal regions having a width W3 therebetween. The branches 62b of the openings 62 extend in the direction of the width of the liquid crystal regions, and thus each opening 62 has a comb shape as a whole as viewed from top. As described in Japanese Laid-Open Patent Publication No. 2002-107730, with the comb-shaped openings 62, the proportion of liquid crystal molecules exposed to a tilt electric field increases, and thus the response characteristic can be improved. However, since the distribution of the response speed of liquid crystal molecules is uniquely influenced by the distance between the rib 61 and the opening 62, the third LC portion low in response speed described above is formed between the rib 61 and the trunk 62a of the opening 62 irrespective of the existence of the branches 62b of the opening 62.

Accordingly, in the MVA LCD having the pixel 300a, also, the effect described above can be obtained by setting the widths W1, W2 and W3 as in the LCD of the embodiments described above.

Thus, according to the present invention, the response characteristic of alignment-divided vertical alignment LCDs is improved, and LCDs permitting moving image display high in contrast ratio are provided. In particular, OS driving can be adopted for alignment-divided vertical alignment LCDs without occurrence of degradation in display quality due to horn response, and thus LCDs permitting high-definition moving image display are provided. The LCDs of the present invention find various applications such as TVs.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC § 119(a) on Patent Application No. 2003-314200 filed in Japan on Sep. 5, 2003, the entire contents of which are hereby incorporated by reference.

What is claimed is:

1. A liquid crystal display device comprising:
   a pair of polarizing plates placed so that their transmission axes are orthogonal to each other; and
   a plurality of pixels provided between the pair of polarizing plates,
   wherein each of the plurality of pixels has a first electrode, a second electrode facing the first electrode, a vertical alignment liquid crystal layer placed between the first and second electrodes, and ribs placed in a surface portion of the liquid crystal layer close to the first electrode and/or a surface portion thereof close to the second electrode, and
   the ribs extend in a direction roughly 45° with respect to the transmission axis of one of the pair of polarizing plates, have slope side faces put in contact with the liquid crystal layer, and satisfy the relationships $RL/PS \geq 0.05$ ($\mu m^{-1}$) and $RS/PS \leq 0.05$ where RS is a product (RL·RH) of a total length RL of the side faces in a pixel as viewed from the normal to the liquid crystal layer and a height RH of the ribs, and PS is a pixel area.

2. The liquid crystal display device of claim 1, wherein $RS/PS \leq 0.04$.

3. The liquid crystal display device of claim 1, wherein the height RH of the ribs is 1 µm or less.

4. The liquid crystal display device of claim 1, wherein the thickness of the liquid crystal layer is less than 3 µm.

5. The liquid crystal display device of claim 1, wherein the ribs are stripe-shaped ribs having a first width placed in the surface portion of the liquid crystal layer close to the first electrode,
   and the pixel further has stripe-shaped slits having a second width formed through the second electrode and stripe-shaped liquid crystal regions having a third width each defined between the adjacent rib and slit.

6. The liquid crystal display device of claim 5, wherein the third width is in a range between 2 µm and 14 µm.

7. The liquid crystal display device of claim 6, wherein the third width is 12 µm or less.

8. The liquid crystal display device of claim 5, wherein the first width is in a range between 4 µm and 20 µm, and the second width is in a range between 4 µm and 20 µm.

9. The liquid crystal display device of claim 5, wherein the first electrode is a counter electrode, and the second electrode is a pixel electrode.

10. The liquid crystal display device of claim 5, wherein the second width/thickness of the liquid crystal layer is 3 or more.

11. The liquid crystal display device of claim 10, wherein the third width/second width is 1.5 or less.

12. Electronic equipment comprising the liquid crystal display device of claim 1.

13. The electronic equipment of claim 12, further comprising a circuit for receiving television broadcast.

* * * * *